US009434788B2

(12) United States Patent
Yadav et al.

(10) Patent No.: US 9,434,788 B2
(45) Date of Patent: Sep. 6, 2016

(54) BIO-BASED FIBER GUMS (BFGS) AND PROCESSES FOR PRODUCING BFGS

(71) Applicant: The United States of America, as represented by the Secretary of Agriculture, Washington, DC (US)

(72) Inventors: Madhav P. Yadav, North Wales, PA (US); Kevin B. Hicks, Malvern, PA (US); David Johnston, Wyndmoor, PA (US); Kyle A. Hanah, Mount Prospect, IL (US); Triveni P. Shukla, Mukwonago, WI (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 436 days.

(21) Appl. No.: 13/798,468

(22) Filed: Mar. 13, 2013

(65) Prior Publication Data

US 2014/0017376 A1  Jan. 16, 2014

Related U.S. Application Data

(60) Provisional application No. 61/670,188, filed on Jul. 11, 2012.

(51) Int. Cl.

| | | |
|---|---|---|
| *C11B 5/00* | (2006.01) |
| *A23B 4/06* | (2006.01) |
| *A23L 1/00* | (2006.01) |
| *A23L 1/20* | (2006.01) |
| *B02B 1/08* | (2006.01) |
| *A01J 25/11* | (2006.01) |
| *A23P 1/00* | (2006.01) |
| *A23L 2/02* | (2006.01) |
| *C08B 37/00* | (2006.01) |
| *A23L 3/3454* | (2006.01) |
| *A23D 7/005* | (2006.01) |
| *A23L 1/052* | (2006.01) |
| *A23L 1/22* | (2006.01) |
| *C08L 3/02* | (2006.01) |

(52) U.S. Cl.
CPC ........... *C08B 37/0003* (2013.01); *A23D 7/005* (2013.01); *A23L 1/052* (2013.01); *A23L 1/22008* (2013.01); *A23L 3/3454* (2013.01); *C08B 37/00* (2013.01); *C08B 37/006* (2013.01); *C08B 37/0057* (2013.01); *C08L 3/02* (2013.01)

(58) Field of Classification Search
CPC . A23L 1/052; A23L 1/22008; A23L 3/3454; C08B 37/0057; C08B 37/0003; C08B 37/00; C08B 37/006; A23K 1/12; A21D 13/02; A23J 1/00
USPC .............. 426/542, 506, 507, 463, 478, 479; 424/750; 435/101
See application file for complete search history.

(56) References Cited

U.S. PATENT DOCUMENTS

| | | | |
|---|---|---|---|
| 4,028,468 A | 6/1977 | Hohner et al. |
| 4,957,599 A | 9/1990 | Chou et al. |
| 5,112,964 A | 5/1992 | Aoe et al. |
| 5,766,662 A | 6/1998 | Inglett |
| 6,147,206 A * | 11/2000 | Doner et al. | .................. 536/128 |
| 7,198,695 B2 | 4/2007 | Kettenbach et al. |

OTHER PUBLICATIONS

Yadav et al., "Structural Characterization of Corn Fiber Gums from Coarse and Fine Fiber and a Study of Their Emulsifying Properties". J Agric. Food Chem 2007, 55, 6366-6371.*
Doner et al., "Analysis and Properties of Arabinoxylans from Discrete Corn Wet-Milling Fiber Fractions". J. Agric Food Chem. 2001, 49, 12-66-1269.*

\* cited by examiner

*Primary Examiner* — Erik Kashnikow
*Assistant Examiner* — Assaf Zilbering
(74) *Attorney, Agent, or Firm* — John D. Fado; G. Byron Stover

(57) ABSTRACT

Processes for the preparation of bio-based fiber gums and products produced by these processes and some of their uses.

21 Claims, 6 Drawing Sheets

US 9,434,788 B2

BIO-BASED FIBER GUMS (BFGS) AND PROCESSES FOR PRODUCING BFGS

REFERENCE TO RELATED APPLICATION

This application claims the benefit of U.S. Provisional Application No. 61/670,188, filed Jul. 11, 2012, which is incorporated herein by reference in its entirety.

BACKGROUND OF THE INVENTION

Described herein are processes for the preparation of bio-based fiber gums involving:

(a) mixing agricultural materials with a heated alkaline solution at temperatures in the range of about 75° to about 150° C. (and preferably in the range of about 85° to about 90° C.) to form a slurry;

(b) separating out the insoluble components from said slurry to yield a solution having a pH of about 9 to about 14 (and preferably in the range of about 10 to about 12) wherein said solution contains about 0.1 to about 10 wt % solids wherein said solids are alkaline soluble fractions;

and one of the following:

(c) evaporating said solution to about 16 to about 23 wt % solids and drying to a powder;

(d) adjusting the pH of said solution to a pH of about 2 to about 12 (and preferably to a pH of about 4 to 10 and more preferably to a pH of about 4 to about 7), evaporating said solution to about 16 to about 23 wt % solids and drying to a powder;

(e) evaporating said solution to about 16 to about 23 wt % solids, adjusting the pH of said solution to a pH of about 2 to about 12 (preferably to a pH of about 4 to 10 and more preferably to a pH of about 4 to about 7), and drying to a powder;

(f) evaporating said solution to about 16 to about 23 wt % solids and precipitating out said soluble components with about two to about five volumes of organic solvent (e.g., ethanol, isopropanol) to form a precipitate and a supernatant, and separately drying said precipitate and said supernatant;

(g) evaporating said solution to about 16 to about 23 wt % solids, adjusting the pH of said solution to a pH of about 2 to about 12 (preferably to a pH of about 4 to 10 and more preferably to a pH1 of about 4 to about 7), and precipitating out said soluble components with one to five volumes (preferably 2 volumes) of organic solvent (e.g., ethanol, isopropanol) to form a precipitate and a supernatant, and separately drying said precipitate and said supernatant;

(h) adjusting the pH of said solution to a pH of about 2 to about 12 (preferably to a pH of about 4 to 10 and more preferably to a pH of about 4 to about 7), evaporating said solution to about 16 to about 23 wt % solids and precipitating out said soluble components with about one to five volumes (preferably about 2 volumes) of organic solvent (e.g., ethanol, isopropanol) to form a precipitate and a supernatant, and separately drying said precipitate and said supernatant; or (i) adjusting the pH of said solution to a pH of about 2 to about 5 (preferably to about 3.5 to about 4.5) to precipitate Hemicellulose A and the remaining solution is treated with about 2 volumes of organic solvent (e.g., ethanol, isopropanol) to form a precipitate and a supernatant, and separately drying said precipitate and said supernatant; and optionally the solution is pretreated with at least one of the following:

(1) de-salting said solution and the de-salted solution becomes the solution;

(2) processing the solution through at least one nano-filtration membrane or ultra-filtration membrane or diafiltration membrane and the permeate becomes the solution; or (3) processing the solution through at least one nano-filtration membrane or ultra-filtration membrane or diafiltration membrane and the retentate becomes the solution.

Also described are products produced by these processes and some of their uses.

When lignocellulosic agricultural residues (e.g., corn stover, wheat straw, rice straw, etc.), agricultural processing byproducts (e.g., corn bran, corn fiber, oat bran, rice hull, sugarcane bagasse, etc.), and energy crops (e.g., miscanthus, switch grass, etc.) are extracted with alkaline solutions to produce cellulose-enriched fractions for food and biofuel applications, there is a waste stream from the process that must undergo expensive waste treatment before it can be disposed. Simultaneously, there is currently a demand for low cost, biobased products that can substitute for petroleum-derived and/or imported oil-in-water and water-in-oil emulsifiers, adhesives, binding agents, useful components of oil-well drilling- and hydraulic fracturing-fluids, viscosifiers, antioxidants, soluble dietary fibers, and serum cholesterol reducing agents. Surprisingly, we have found that the waste stream from the lignocellulosic product processing noted above, can be processed by evaporating, drying, membrane filtration, solvent precipitation and/or other methods described herein to yield novel compositions that can function as substitutes for the petroleum-derived and/or imported products noted above. This finding thus allows the conversion of a waste material with negative value to a value added-product with many applications described herein.

SUMMARY OF THE INVENTION

Processes for the preparation of bio-based fiber gums involving:

(a) mixing agricultural materials with a heated alkaline solution at temperatures in the range of about 75° to about 150° C. (and preferably in the range of about 85° to about 90° C.) to form a slurry;

(b) separating out the insoluble components from said slurry to yield a solution having a pH of about 9 to about 14 (and preferably in the range of about 10 to about 12) wherein said solution contains about 0.1 to about 10 wt % solids wherein said solids are alkaline soluble fractions;

and one of the following:

(c) evaporating said solution to about 16 to about 23 wt % solids and drying to a powder;

(d) adjusting the pH of said solution to a pH of about 2 to about 12 (and preferably to a pH of about 4 to 10 and more preferably to a pH of about 4 to about 7), evaporating said solution to about 16 to about 23 wt % solids and drying to a powder;

(e) evaporating said solution to about 16 to about 23 wt % solids, adjusting the pH of said solution to a pH of about 2 to about 12 (preferably to a pH of about 4 to 10 and more preferably to a pH of about 4 to about 7), and drying to a powder;

(f) evaporating said solution to about 16 to about 23 wt % solids and precipitating out said soluble components with about two to about five volumes of organic solvent (e.g., ethanol, isopropanol) to form a precipitate and a supernatant, and separately drying said precipitate and said supernatant;

(g) evaporating said solution to about 16 to about 23 wt % solids, adjusting the pH of said solution to a pH of about 2 to about 12 (preferably to a pH of about 4 to 10 and more preferably to a pH of about 4 to about 7), and precipitating out said soluble components with one to five volumes (preferably 2 volumes) of organic solvent (e.g., ethanol) to form a precipitate and a supernatant, and separately drying said precipitate and said supernatant;

(h) adjusting the pH of said solution to a pH of about 2 to about 12 (preferably to a pH of about 4 to 10 and more preferably to a pH of about 4 to about 7), evaporating said solution to about 16 to about 23 wt % solids and precipitating out said soluble components with about one to five volumes (preferably about 2 volumes) of organic solvent (e.g., ethanol) to form a precipitate and a supernatant, and separately drying said precipitate and said supernatant; or (i) adjusting the pH of said solution to a pH of about 2 to about 5 (preferably to about 3.5 to about 4.5) to precipitate Hemicellulose A and the remaining solution is treated with about 2 volumes of solvent (e.g., ethanol) to form a precipitate and a supernatant, and separately drying said precipitate and said supernatant; and optionally the solution is pretreated with at least one of the following:

(1) de-salting said solution and the de-salted solution becomes the solution;

(2) processing the solution through at least one nano-filtration membrane or ultra-filtration membrane or diafiltration membrane and the permeate becomes the solution; or (3) processing the solution through at least one nano-filtration membrane or ultra-filtration membrane or diafiltration membrane and the retentate becomes the solution.

Also products produced by these processes and some of their uses.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION OF THE INVENTION

Disclosed are processes for producing novel bio-based fiber gums (BFGs) and mixtures by alkaline extraction of agricultural products and/or lignocellulosic agricultural by-products (e.g., corn bran/fiber or other bran/fiber samples such as oat bran, wheat bran, barley straw and hull, sugar cane bagasse, corn stover, wheat straw, sorghum bran) and/or lignocellulosic energy crops (e.g., switchgrass and miscanthus). The term "agricultural materials" is defined herein as including agricultural products, lignocellulosic agricultural by-products, and lignocellulosic energy crops, individually or as mixtures. These processes utilize a solution produced by the following steps: (a) mixing agricultural materials with a heated alkaline solution at a temperature range of about 75° to about 150° C. (e.g., 75-150° C.; preferably about 85° to about 90° C. (e.g., 85-90° C.)) to form a slurry; and (b) separating out the insoluble components from the slurry to yield a solution having a pH of about 9 to about 14 (e.g., 9-14; preferably about 10 to about 12 (e.g., 10-12)) wherein the solution contains about 0.1 to about 10 wt % (e.g., 0.1-10 wt %) solids wherein the solids are alkaline soluble fractions. Several classes of new products (e.g., crude, semi-pure, and pure, plus the permeate samples containing non-BFG components described below) can be made from the waste stream (the "solution" above) resulting from making cellulosic gels such as ZTrim by practice of U.S. Pat. No. 5,766,662, although the same products can also be made by other similar processes which extract corn bran or agricultural materials including other bran/fiber samples, agricultural byproducts and lignocellulosic energy crops with alkaline aqueous solutions, with the products being in the alkaline extract (the "solution" above). In the Z-Trim process under U.S. Pat. No. 5,766,662, corn bran and other lignocellulosic materials were extracted with hot sodium hydroxide solution (without hydrogen peroxide) to extract alkaline soluble components, leaving a residue which was found to be enriched in cellulose; our compositions do not include these materials. Our processes can utilize that alkaline extract "waste stream" that contains soluble arabinoxylan and other unique and useful components and use it to make our bio-based fiber gums (BFG) and mixtures.

Several unique processes can be used to produce our crude gum mixtures and purified gums. Some of these processes are provided in FIGS. 1-5, which are examples of processes for making these BFGs and mixtures using ultrafiltration or diafiltration membrane or other filtration, precipitation, and deionization systems.

Figure 1:
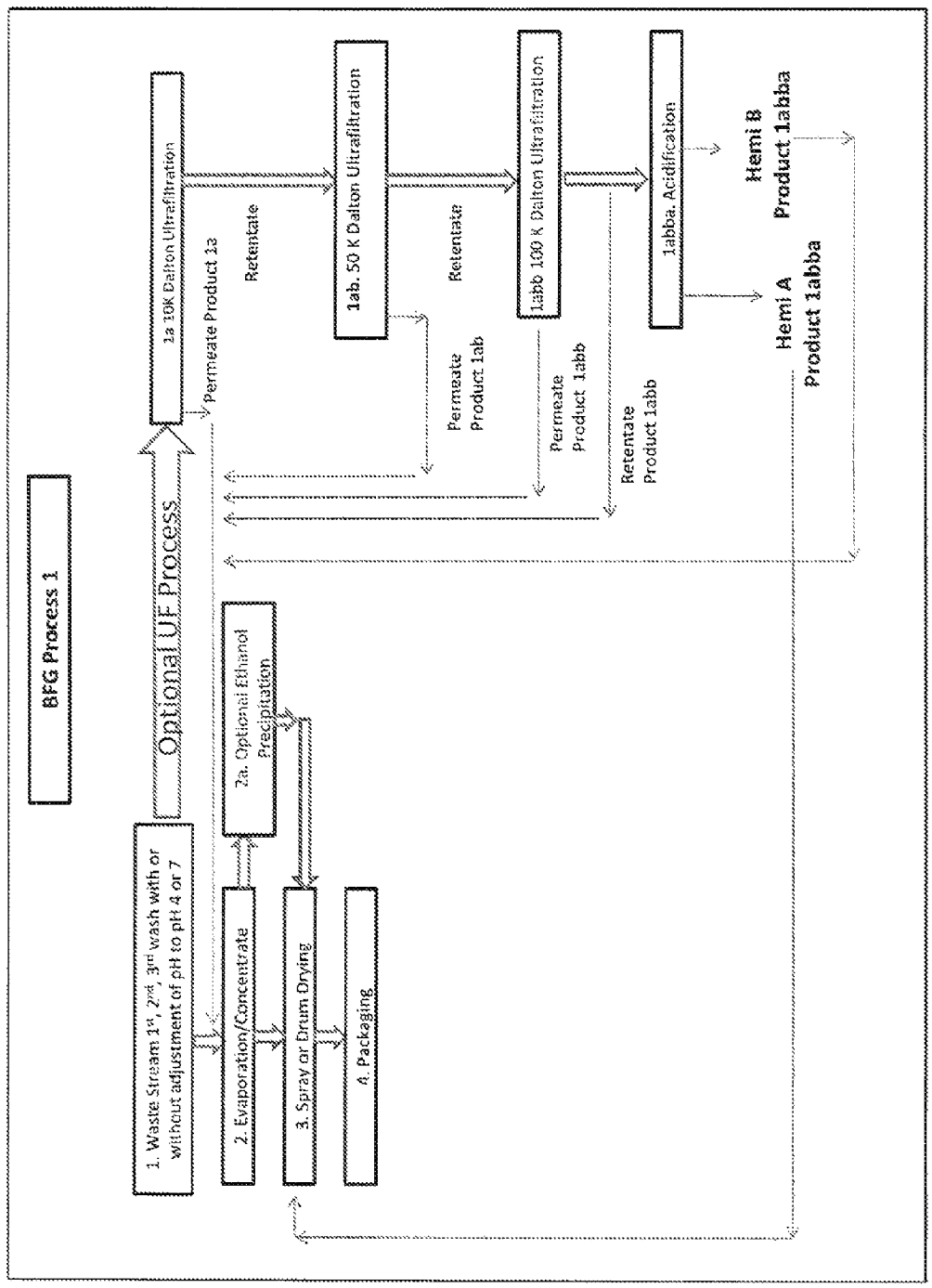
FIG. 1 shows a diagram of several of our novel processes for producing either crude, semi-purified, or purified Bio-based Fiber Gums (BFGs) from alkaline extracts of agricultural residues (e.g., corn stover, wheat straw, rice straw, etc.), agricultural processing by-products (e.g., corn bran, corn fiber, oat bran, rice hull, sugarcane bagasse, etc.) or energy crops (e.g., miscanthus, switch grass, etc.) which includes (left side of Figure) simple processes for making crude and semi-purified BFGs by direct evaporation (partial drying) of the extract (with or without pH adjustment) followed by either ethanol precipitation, spray drying, or drum drying; or (right side of Figure) more elaborate processes including sequential treatment with membranes of increasing nominal molecular-weight cut-off (MWCO) to make pure unique BFG fractions with components separated by molecular weight and found primarily in the retentate of the sequential membrane processing, as described below; with the permeates containing other useful products (such as road deicers, fertilizers, antioxidants, and oligosaccharides suitable for prebiotics).

Crude and semi-purified BFGs and mixtures using processes in FIG. 1: In FIG. 1 (and FIG. 4), the waste stream from U.S. Pat. No. 5,766,662 or any other suitable alkaline extract of agricultural materials (e.g., corn bran or other bran/fiber/plant biomass samples), with about 0.1 to about 10 wt % solids (e.g., 0.1-10 wt %; preferably about 0.6 to about 0.9 wt % solids (e.g., 0.6-0.9 wt %)) can be converted to novel compositions using several novel processes. One process includes the concentration of the waste stream at its initial pH of about 11.8 (e.g., 11.8) from its initial low solids content to about 16 to about 23 wt % (e.g., 16-23 wt %) solids by evaporation (partial drying) in an evaporator to produce a concentrated solution that can be further dried to make a shelf-stable product. Evaporating can utilize any type of system known in the art that evaporates water, for example using steam, electrical heating, vacuum, multiple effect, single effect, etc. Alternatively, for expanding food and non-food product applications to those that require neutral or acidic pH values, the waste stream can be reduced to a lower pH of about 4 to about 7 (e.g., pH 4-7) by the addition of mineral or organic acid (e.g., hydrochloric and sulfuric acid (mineral acids) or citric or acetic acid (organic acids) prior to or after concentrating to higher solids content in the evaporator. Evaporation (partial drying) is an efficient way to concentrate solutions to higher solids but not a good way to completely dry a product. These concentrated crude BFG mixtures can then be dried, for example by either spray drying or drum drying prior to packaging. For drum drying, the original alkaline extract with about 0.6 to 0.9 wt % (e.g., 0.6-0.9 wt %) solids at the original or adjusted pH values can be concentrated to higher solids content (e.g., about 20 to about 30 wt % (e.g., 20-30 wt %), preferably about 23 wt % solids (e.g., 23 wt %)) and dried to a powder by a drum drying process. One can dry solutions to fairly high wt % solids before drying on a drum dryer, the thick solution can be easily poured on the top of a rotating hot drum and the water is evaporated quickly and the product is then scraped off the roller. For spray drying, the original alkaline or pH-adjusted extract can be evaporated to about 16 to about 20 wt % solids (e.g., 16-20 wt %) and then dried to a powder by using a spray dryer. With a spray dryer one must be careful to not concentrate the solution too much because the solution can become very viscous. In spray drying one must pump the liquid to be dried through narrow tubing and then through a narrow "atomizer" which delivers a highly dispersed spray into heated air, drying the spray immediately. If the solution is too viscous, it cannot be pumped through this system which is why one must choose to use a lower wt % solids for spray drying. The drum dried powders and spray dried powders are two different shelf-stable forms of crude corn bran BFG or corn fiber BFG though they generally contain about the same wt % solids (e.g., >about 90 wt %). While the composition of each is similar, the spray dried product has a more gently-dried agglomerated structure that can be more rapidly dissolved in liquids whereas the drum dried product is more harshly dried and may have more brown discoloration due to reactions between reducing sugars and amines (Amadori reactions). The drum dried product is also less expensive to produce. Thus one can select which drying process to use based upon product applications and economics. Alternatively to the concentration by evaporating and direct drying, the concentrated crude mixtures (before drying) can be treated with an organic solvent (e.g., ethanol, propanol, acetone, or any other suitable organic solvent) to precipitate a semi-purified corn bran BFG that can be recovered by filtration and dried. This is accomplished by addition of the organic solvent, such as ethanol, in an amount necessary for precipitating pure BFG from the solution. The volume of organic solvent added should be in the range of about 1 to about 5 times (e.g., 1-5×; preferably about 2× (e.g., 2×)) to the volume of the concentrated solution. The required amount of organic solvent is added to the concentrated mixture and then the resulting white, flocculent BFG precipitate is allowed to settle to the bottom of the container being used for this process. The clear solvent (e.g., ethanol)/water mixture above the precipitate is removed by decantation. The flocculent precipitate is then washed with a small amount of pure organic solvent (e.g., 100% ethanol) to remove moisture, filtered under vacuum, collected, and dried under vacuum at about 40° to about 60° C. (e.g., 40-60° C.; preferably at about 50° C. (e.g., 50° C.)), a temperature that rapidly dries the product but causes no thermal degradation of the BFG. This ethanol precipitated product is called "semi-pure" or "semi-purified" corn bran BFG. These three types of products (spray dried, drum dried, and ethanol precipitated) were produced from the concentrated Z-Trim "waste stream" with initial pH values of 11.8 or adjusted pH values of 7.0 and 4.0, which produced 9 separate products: three (pH 11.8, pH 7.0, and pH 4.0) mixtures treated by three different processes (drum dried, spray dried, or ethanol precipitated) as described above. These products are designated as Samples A-I in Table 1. Another set of the pH 4 adjusted samples was also processed identically to those noted above except for one difference: the samples were filtered to remove insoluble hemicellulose A (which is insoluble at pH 4) as well as other pH 4 insoluble components prior to ethanol precipitation, drum or spray drying as described above. Those samples are listed at samples J-L in Table 1.

Alternative processes to make semi-pure and purified BFGs from processes in FIG. 1: Alternatively, as shown in FIG. 1 (and FIG. 5), the original waste stream from U.S. Pat.

No. 5,766,662 or any other suitable alkaline extract of corn bran/fiber or other bran/fiber/plant biomass can be treated by ultrafiltration or diafiltration membrane or nanofiltration or other suitable molecular filtration processes such as microfiltration to further purify the product. Any membrane known in the art could be utilized. For instance, as shown in FIG. 1, the waste stream, with or without pH modification, can be processed with a 10,000 Dalton MWCO ultrafiltration membrane in which small molecular weight molecules (less than 10,000 Daltons) permeate through the membrane and are then processed by evaporation, spray drying, drum drying, or ethanol precipitation. This permeate contains a unique composition of molecules including degraded starch- and hemicellulose-derived oligosaccharides, sugars, amino acids, peptides, soluble phenolic acids, soluble fatty acid salts, organic and inorganic acids and their salts, all of which are less than about 10,000 Daltons (e.g., <10,000 Daltons) in molecular weight and have application as deicers, fertilizers, antioxidants, and prebiotics for animal feeds. Then the retentate from that membrane, containing unique compositions of molecules generally larger than 10,000 Daltons, is processed by a 50,000 Dalton MWCO membrane. The permeate from the 50,000 Dalton MWCO membrane contains a unique mixture of molecules with molecular weights between about 10,000 and 50,000 daltons, including degraded starch- and hemicellulose-derived oligosaccharides and polysaccharides, peptides, and proteins, all of which are less than about 50,000 Daltons (e.g., <50,000 Daltons) in molecular weight. This mixture would be useful as a prebiotic for human or animal feeds. This permeate is then sent to the evaporator and similarly processed by drum or spray drying or ethanol precipitation. The retentate from the 50,000 Dalton MWCO membrane is then processed with a 100,000 Dalton MWCO membrane. The permeate from the 100,000 Dalton membrane contains a unique mixtures of molecules that are between 50,000 and 100,000 Daltons including degraded starch, hemicellulose-derived oligosaccharides and polysaccharides, and proteins that would have applications as prebiotics for humans or animal diets. This permeate is then processed by evaporation, drum or spray drying or ethanol precipiation. Finally, the retentate from the 100,000 Dalton MWCO membrane, containing a unique mixture of molecules larger than 100,000 Daltons, is then processed by evaporation, drum or spray drying or ethanol precipitation to produce highly purified BFG products containing primarily arabinoxylans (also known as hemicellulose). An alternative to this process, shown in FIG. 1, is to make one additional purification of the 100,000 Dalton MWCO membrane retentate by adjusting the pH of the final retentate to between about pH 3 to about 5 (e.g., pH 3-5; preferably about pH 4 (e.g., pH 4)) at which time one fraction of the arabinoxylans (gums) called hemicellulose-A precipitates from solution. That precipitate is filtered out of the mixture leaving purified and soluble hemicellulose-B in the final solution, which is then processed by evaporation followed by spray or drum drying or ethanol precipitation to yield a pure BFG product. The precipitated hemicellulose A fraction may also be dried in a regular or vacuum oven or drum dried to yield an additional product.

Figure 2:
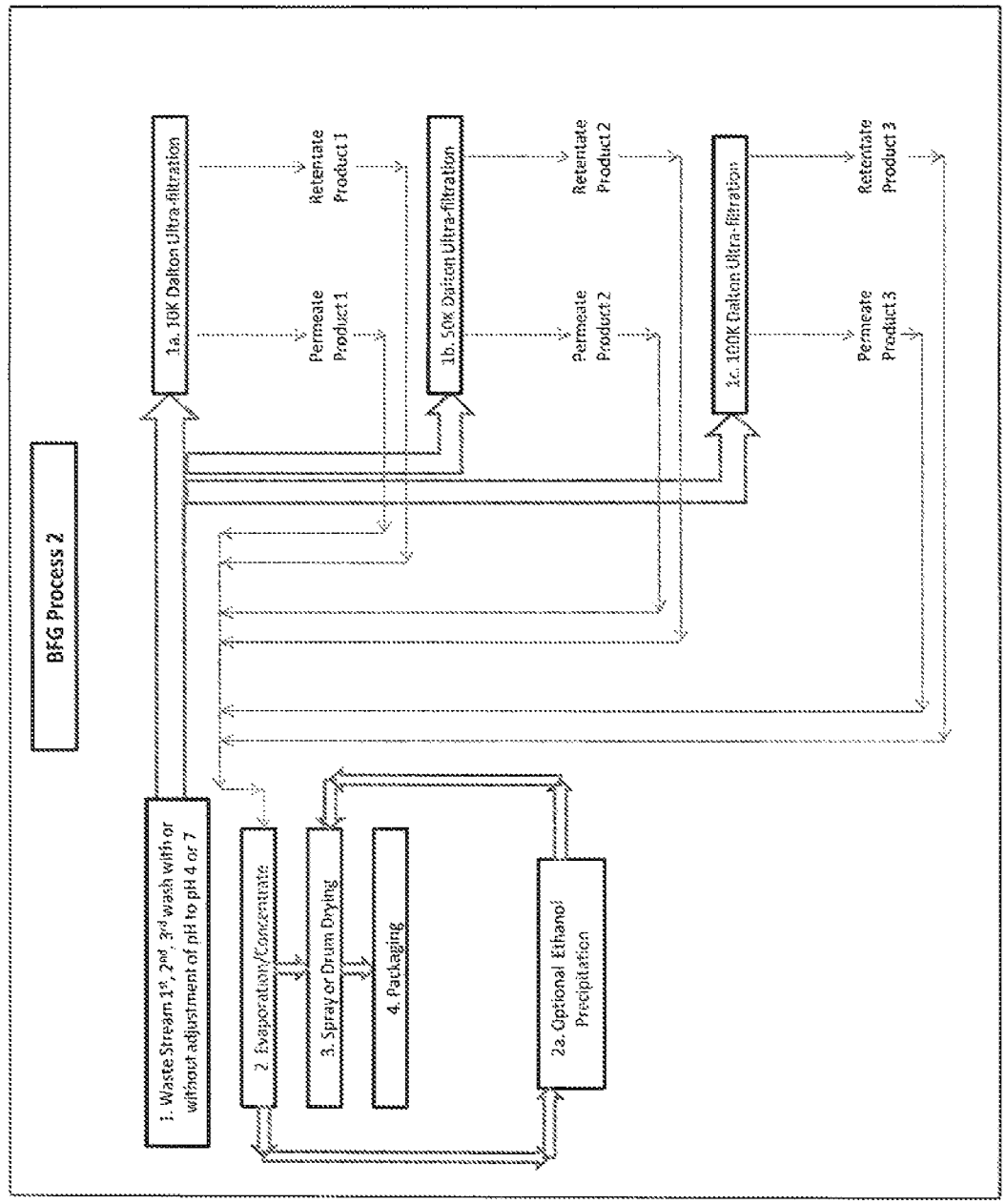
FIG. 2 shows a diagram of several of our novel processes for producing semi-pure and purified Bio-based Fiber Gums from alkaline extracts of agricultural products or agricultural by-products (e.g., corn bran) which includes treatment with either low, medium, or high molecular weight cut-off membranes followed by processing the retentates and permeates by evaporation (partial drying) followed by either ethanol precipitation or spray or drum drying as described below. Purified BFGs are found primarily in the dried retentates with the permeates containing other useful products (such as road deicers, fertilizers, antioxidants, and oligosaccharides suitable for prebiotics). Retentates undergoing ethanol precipitation prior to drying are also purified BFGs.

Preparation of Crude and Purified BFGs and mixtures by processes in FIG. 2: An alternative membrane purification process is shown in FIG. 2. This process is similar to FIG. 1 except that the original waste stream is not processed through all three different MWCO membranes (i.e., 10,000 Dalton, 50,000 Dalton, and 100,000 Dalton) but rather is processed by just one membrane, for example either a 10,000 Dalton MWCO membrane, a 50,000 Dalton MWCO membrane, or a 100,000 Dalton MWCO membrane, and the respective retentates and permeates are then processed by the evaporation, ethanol precipitation, spray or drum drying procedures as noted above to produce dry products. Additional details are described below:

Processing with a 10,000 Dalton MWCO membrane in FIG. 2: The permeate from the 10,000 Dalton MWCO membrane contains a unique composition of molecules including degraded starch- and hemicellulose-derived oligosaccharides, sugars, amino acids, peptides, soluble phenolic acids, soluble fatty acid salts, organic and inorganic acids and their salts, all of which are less than about 10,000 Daltons (e.g., <10,000 Daltons) in molecular weight and have application as deicers, fertilizers, antioxidants, and prebiotics for animal feeds. The retentate from the 10,000 Dalton MWCO membrane is a semi-pure BFG mixture containing primarily soluble arabinoxylan polysaccharides but also starch- and hemicellulose-derived oligosaccharides, peptides, and proteins, all of which are greater than 10,000 Daltons in molecular weight. The product can be concentrated with an evaporator and then spray- or drum dried to yield a semi-pure BFG. Optionally, prior to drying, the retentate solution can be treated by adding an organic solvent (e.g., ethanol) in an amount necessary to precipitate pure BFG from the solution as described above. The volume of solvent added should be in the range of about 1 to about 5× volume (e.g., 1-5×; preferably about 2× (e.g., 2×)) of concentrated solution in order to precipitate pure BFG but no impurities. The precipitated purified BFG can be recovered and dried as described above.

Processing with a 50,000 Dalton MWCO membrane in FIG. 2: The permeate from the 50,000 Dalton MWCO membrane contains a unique composition of molecules including degraded starch- and hemicellulose-derived oligosaccharides, sugars, amino acids, peptides, soluble phenolic acids, soluble fatty acid salts, organic and inorganic acids and their salts, all of which are less than about 50,000 Daltons (e.g., <50,000 Daltons) in molecular weight and have application as deicers, fertilizers, antioxidants, and prebiotics for animal feeds, and after desalting could be used for human prebiotics. The retentate from the 50,000 Dalton MWCO membrane is a semi-pure BFG mixture containing primarily soluble arabinoxylan polysaccharides but also degraded starch- and hemicellulose-derived oligosaccharides, peptides, and proteins, all of which are greater than 50,000 Daltons in molecular weight. The product can be concentrated with an evaporator and then spray dried or drum dried to yield a purified BFG. Optionally, prior to drying, the retentate can be treated with an organic solvent (e.g., ethanol) as described above to precipitate an even more purified BFG, that can be recovered and dried as described above.

Processing with a 100,000 Dalton MWCO membrane in FIG. 2: The permeate from the 100,000 Dalton MWCO membrane contains a unique composition of molecules including low molecular weight starch, degraded starch- and hemicellulose-derived oligosaccharides and polysaccharides, sugars, amino acids, peptides, soluble phenolic acids, soluble fatty acid salts, organic and inorganic acids and their salts, all of which are less than about 100,000 Daltons (e.g., <100,000 Daltons) in molecular weight and have application as deicers, fertilizers, antioxidants, and prebiotics for animal feeds and, with de-salting could be used as human prebiotics. The retentate from the 100,000 Dalton MWCO membrane is a purified BFG containing primarily soluble arabinoxylan polysaccharides which are greater than 100,000 Daltons in molecular weight. The product can be concentrated with an evaporator and then spray dried or drum dried to yield a pure BFG. Optionally, prior to drying, the retentate can be treated by adding a suitable amount of organic solvent (e.g., ethanol) in the range of about 1× to about 5× (e.g., 1-5×) the volume of concentrated solution, to precipitate an even more purified BFG, that can be recovered and dried as described above. Or optionally, prior to drying, the retentate can be processed by adjusting the pH of the final retentate to a pH of about 3 to about 5 (e.g., pH 3-5; preferably about pH 4 (e.g., pH 4)) at which time one fraction of the arabinoxylans (gums) called hemicellulose-A precipitates from solution. That precipitate is filtered out of the mixture leaving purified soluble hemicellulose-B in the final solution, which is then processed by evaporation followed by spray drying or drum drying or ethanol precipitation to yield a pure BFG product. The precipitated hemicellulose A fraction may also be dried in a regular or vacuum oven or drum dried to yield an additional product.

These processes were conducted in a pilot plant producing a total of 6 products, the dried permeate and retentate fractions from a 10K, a 50K, and a 100K Dalton membrane. Those 6 samples are listed at Samples M, N, O, P, Q, and R in Table 1. Separation of hemicellulose A from crude or purified BFG samples from these schemes can also be achieved by filtration of the aqueous mixtures after adjusting to a pH of about 3 to about 5 (e.g., pH 3-5; preferably about 4 (e.g., pH 4)) before converting to solid products.

An alternative method of producing purified BFG by ethanol precipitation: Another process was used on the original waste-stream from U.S. Pat. No. 5,766,662 to produce a purified BFG sample. This was prepared by taking the original waste stream and directly processing without initial evaporation/concentration to yield a purified fraction which is listed in Table 1 as Sample S. The details of this process were as follows: First, the pH was adjusted to a pH of about 3 to about 5 (e.g., pH 3-5; preferably about 4 (e.g., pH 4)) to precipitate Hemicellulose A, which was collected by centrifugation at 10,000 g. The supernatant was then precipitated by adding about 1× to about 5× (e.g., 1-5×; preferably about 2× (e.g., 2×)) volumes of organic solvent (e.g., 100% ethanol). The flocculent precipitate was collected by filtration, washed with solvent (e.g., 100% ethanol), and dried in a vacuum oven at about 50° C. (e.g., 50° C.), a temperature that leads to rapid drying but no thermal degradation of the BFG.

Figure 3:
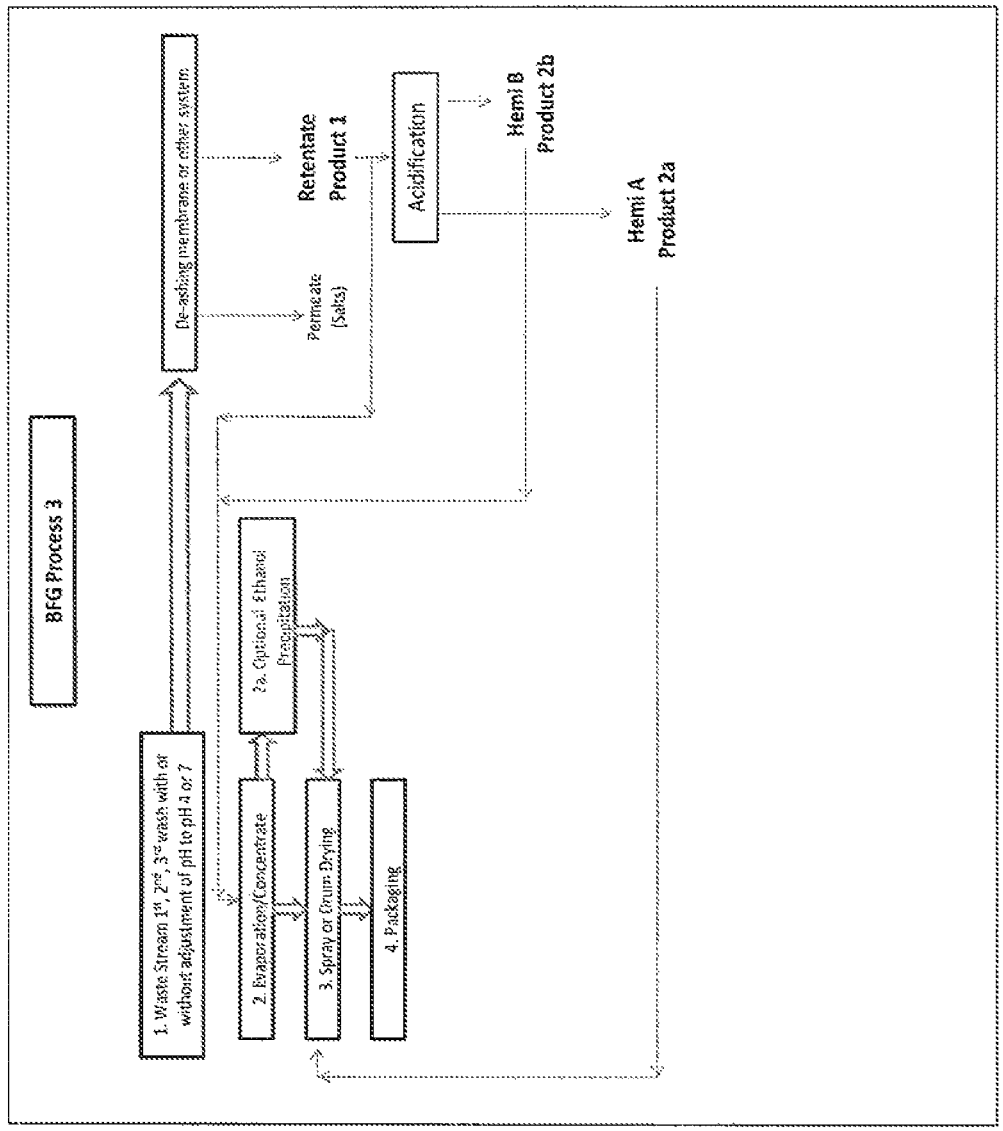
FIG. 3 shows a diagram of several of our novel processes for producing semi-purified and purified Bio-based Fiber Gums from alkaline extracts of agricultural products or agricultural by-products (e.g., corn bran) which includes simple de-ashing of the extract by ultrafiltration or other similarly effective filtration or de-ashing systems known in the art, followed by evaporation (partial drying) followed by either ethanol precipitation, drum, or spray drying as described below; alternatively, by acidification of the retentate, separate streams of hemicellulose A and hemicellulose B bio-based fiber gums can be produced. Those produced without ethanol precipitation are semi-purified BFGs and those produced with ethanol precipitation are purified BFGs.
Figure 4:
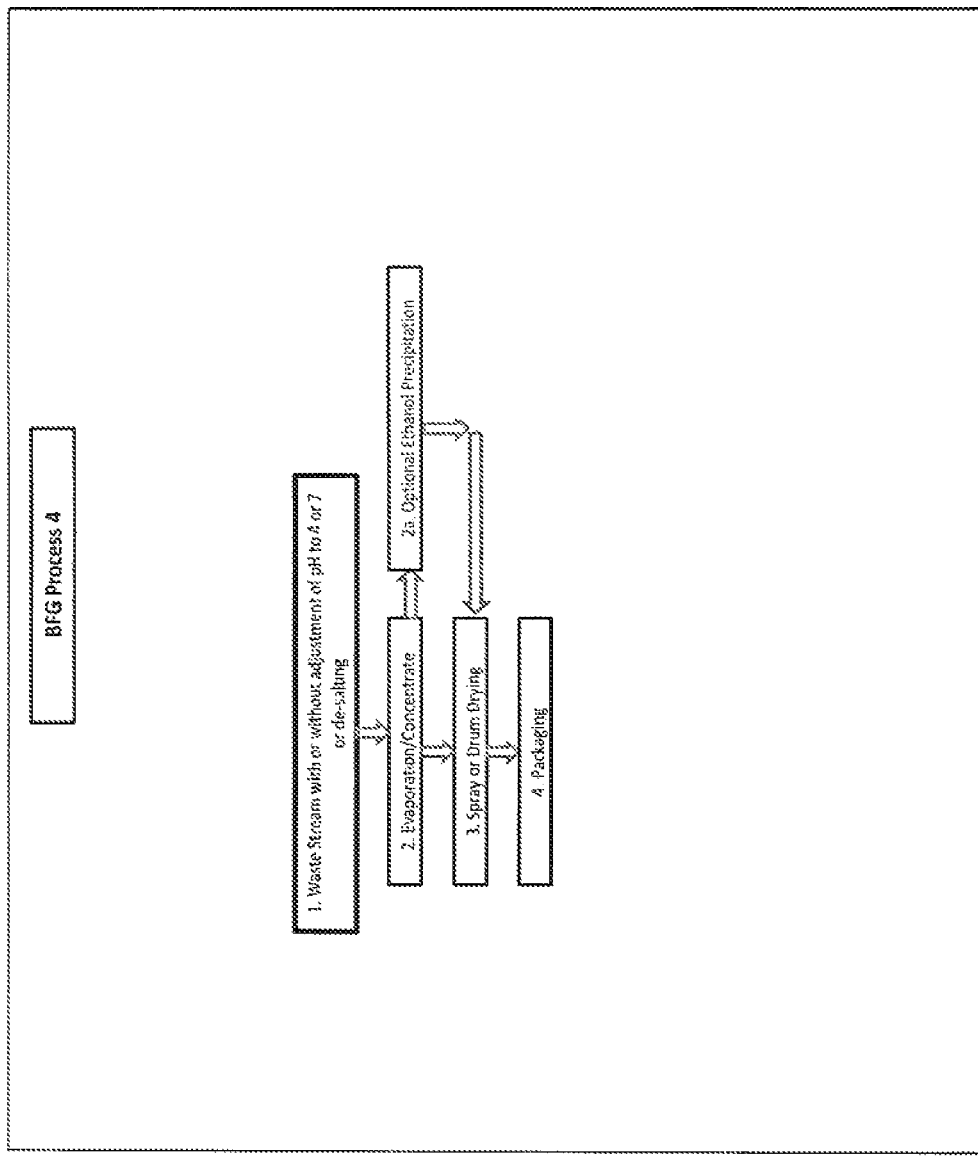
FIG. 4 is a section of FIG. 1 which shows a diagram of our simplest novel processes for producing crude and semi-purified Bio-based Fiber Gums from alkaline extracts of agricultural products or agricultural by-products (e.g., corn bran) which includes simple processes for direct evaporation (partial drying) of the extract (with or without pH adjustment) followed by either ethanol precipitation, spray drying, or drum drying. Those made without ethanol precipitation are crude BFGs whereas those made with ethanol precipitation are semi-purified BFGs.

Semi-purified BFG products produced according to FIG. 3: A third novel process is shown in FIG. 3 in which the alkaline waste stream is processed by a simple de-ashing system to remove salts and ash from the waste stream after it has either been adjusted to pH 4-7 or left at the initial alkaline pH of about 11.8. The de-ashing system could include a 300 to 10,000 Dalton membrane, a mixed-bed (cation and anion) ion exchange resin, or other suitable de-ashing systems known in the art. The deashed product can then be sent directly to processing by evaporation, followed by spray drying or drum drying or ethanol precipitation to yield stable dry semi-pure BFG products. Removal of the insoluble hemicellulose A before concentration and drying is also possible as show in FIG. 3. The permeate or salts fraction can then be evaporated and dried by suitable methods to yield salt mixtures useful for de-icing when either sodium or calcium are the major metal ions, or as agricultural fertilizers when potassium is the major metal ion present in the salt fraction.

The processes do not utilize oxidizing agents (e.g., hydrogen peroxide, sodium hypochlorite, chlorine dioxide, ozone, etc.).

The term "gum" as used herein is defined as a water soluble hemicellulose extracted from a plant source, typically an arabinoxylan or derivative thereof, but also may include other non-starch polysaccharides. The gums described herein have functional properties that can provide viscosity, emulsion stability, freeze-thaw stability, adhesive and binding properties, and other helpful benefits to food and non food products and may also lead to serum cholesterol-reducing, antioxidative, and other health-promoting activities in humans and animals when consumed.

Uniqueness of products: The crude, dried forms of BFG contain unique mixtures of molecularly-dispersed hemicelluloses containing feruloyl-arabinoxylans (also known as gums) and oligosaccharides, starch or degraded starch, other oligosaccharides, disaccharides, monosaccharides, lignin, protein, lipids, phenolic acids, minerals, etc. These mixtures are unique and we have found that these mixtures have several unexpected useful functional properties that make them useful as oil-in-water and water-in-oil emulsifiers, as adhesives, as binding agents, as useful components of oil-well drilling- and hydraulic fracturing-fluids, as viscosifiers, as antioxidants, a soluble dietary fibers and serum cholesterol reducing agents, and for many other applications. Arabinoxylans can be isolated from corn fiber or bran by extraction with an alkaline hydrogen peroxide such as the process taught in U.S. Pat. No. 6,147,206. The product of U.S. Pat. No. 6,147,206 is a purified arabinoxylan. Our new products described herein are either unique crude mixtures of feruloyl-arabinoxylans plus other functional molecules, or more purified feruloyl-arabinoxylans that have significant structural and functional differences from the product in U.S. Pat. No. 6,147,206 since, for one reason, we are not using hydrogen peroxide in the alkaline extraction as was done in U.S. Pat. No. 6,147,206, thus the arabinoxylan has not been bleached to remove proteinaceous, phenolic (e.g., ferulic acid), and lipid-type components that are associated with the arabinoxylan in its natural state. These components make the feruloyl-arabinoxylan have superior properties and applications compared to previously produced arabinoxylan products such as those in U.S. Pat. No. 6,147,206. Thus, whereas the use of purified corn fiber arabinoxylan, also called corn fiber gum (CFG), as an emulsifier has been reported previously by us, its use in a crude form (not bleached with hydrogen peroxide) with other natural components as an emulsifier is new. Other unique compositions are described herein. Furthermore, examples of additional new uses for this gum and other bio-based fiber gums from other plant sources, in pure or crude form, are provided herein. There is also one more difference between the present products and in U.S. Pat. No. 6,147,206, the starting feedstock for making the gum was corn fiber instead of corn bran (although our processes can use corn bran as the starting feedstock). Corn fiber is the fibrous portion of a corn kernel that was originally present in the kernel's hull and endosperm but was removed and recovered by an industrial corn wet milling process. Our preferred feedstock is corn bran which is the fibrous material primarily from the hull only with little or no endosperm. Corn bran is the fibrous product removed and recovered by an industrial corn dry milling process. Surprisingly, the present processes can be used to obtain unique gums from agricultural byproducts such as corn fiber, oat bran, wheat bran, barley straw and hull, sugar cane bagasse, corn stover, wheat straw, and sorghum bran, and lignocellulosic biomass and energy crops such as switchgrass and miscanthus.

Our processes described in FIGS. 1-5, utilizing the alkaline extract of corn fiber/bran, oat bran, or any of the other fiber-containing products listed above, produce novel compositions of two types: The first are purified compounds and the second are novel mixtures of compounds:

1. Novel compositions containing purified compounds: As carefully detailed here, processes from FIGS. 1-3 and 5 can be used to prepare purified BFGs from, for example, corn bran. The purified BFG, prepared without oxidizing agent, is a novel composition composed of an arabinoxylan that is useful as a binding agent for making pellets and briquettes from powders of carbonaceous materials such as petroleum coke, coal dust, charcoal powder, etc., as an adhesive for porous materials such as paper and wood, as an emulsifier for stabilizing oil-in-water and water-in oil emulsions, as a water-soluble anti-oxidant, viscosity modifier, film former, encapsulating agent, and as a soluble dietary fiber with antioxidant properties. Purified corn bran BFG feruloyl-arabinoxylan isolated by our processes as described in FIGS. 1, 2, 3 and 5 and Table 1 and represented as sample S, for instance, had a weight average molecular weight of about 335 kDa (Table 11) that can range from about 190 to about 390 kDA (e.g., 190-390 kDA), a sugar composition (Table 13) of about 24 to about 27% (e.g., 24-27%) arabinose, about 48 to about 51% (e.g., 48-51%) xylose, about 7 to about 9% (e.g., 7-9%) galactose, about 6 to about 14% (e.g., 6-14%) glucose, and about 3 to about 7% (3-7%) glucuronic acid, and a ratio of arabinose/xylose of about 0.5 (e.g., 0.5). Molecular characteristics of additional purified corn bran BFGs prepared by procedures described in FIGS. 1-3 and 5, such as samples O and Q identified in Table 1, are similar to sample S. We expect that the pure corn bran BFG arabinoxylan isolated by our processes in FIGS. 1-3 and 5 contains protein and extractable lipids in which the lipids present are generally triacylgylcerols, phytosterols, free fatty acids, and hydroxycinnamic acids such as ferulic acid. The arabinose to xylose ratio of about 0.5 (e.g., 0.5) in Table 13 was much lower than the value of about 0.82 reported by Doner et al. (Doner, L. W., et al., Cereal Chem., 75(4):408-411 (1998)) using an alkaline hydrogen peroxide extraction to make corn fiber gum (arabinoxylan), which indicated that the present BFG isolated only with sodium hydroxide extraction had much less branching of arabinose groups on the xylan backbone. Also the intrinsic viscosity (0.9-1.5 dL/g) and Mark Houwink exponent (0.43-0.52) values in Table 11 for the BFGs produced by our new processes varied considerably from the values of 1.92 dL/g and 0.84 reported by Fishman et al. (Fishman, M. L., et al., Int. J. Polym. Anal. Charact., 5: 359-379 (2000)) for corn kernel arabinoxylan isolated by alkaline hydrogen peroxide technology. These facts showed that purified BFGs isolated using the presently described processes were unique and different from known compositions.

2. Novel compositions containing novel mixtures of compounds: Our novel compositions produced by processes in FIGS. 1-5 can be divided into two different classes: "a" those that contain a mixture of BFG arabinoxylans plus many other functional components and "b" those that contain primarily non-BFG arabinoxylan functional components. One can estimate the % arabinoxylan in these mixtures from the last columns of Table 1 and Table 5. Crude mixtures produced by procedures in FIGS. 1 and 4, for instance, and represented by Samples A-F, represent the first "a" class above and contained from about 40 to about 60% (e.g., 40-60%) arabinoxylan polysaccharides (Table 1) with a weight average molecular weight of about 190,000 to about 380,000 Daltons (e.g., 190,000-380,000 Daltons) (Table 11). The arabinoxylan (BFG) in these crude mixtures also contained the same molecularly associated proteins, triacylglycerols, phytosterols, fatty acids, hydroxycinnamic acids, and the same ratio of arabinose to xylose as the purified BFG arabinoxylans described above. In addition to those BFG arabinoxylans and molecularly associated components just described above, these mixtures also contained additional amounts of the following unassociated (free) functional components: from about 1 to about 10% (e.g., 1-10%) free phenolic compounds such as ferulic acid and other hydroxycinnamic acids, about 0.5 to 10% (e.g., 0.5-10%) free proteins, from about 5 to about 60% (e.g., 5-60%) inorganic salts such as sodium or potassium chloride, from about 0.5 to about 5% (e.g., 0.5-5%) lignin, from about 5 to about 50% (e.g., 5-50%) arabinoxylan-derived oligosaccharides, and from about 5 to about 20% (e.g., 5-20%) starch-based oligosaccharides. The composition had a pH between about 3 and about 14 (e.g., 3-14), and has utility as a binding agent for making pellets and briquettes from powders of materials such as petroleum coke, coal dust, charcoal powder, etc., as an adhesive for porous materials such as paper and wood, as an emulsifier for stabilizing oil-in-water and water-in oil emulsions, as a water-soluble anti-oxidant, viscosity modifier, film former, encapsulating agent, and soluble prebiotic and dietary fiber with antioxidative properties.

Figure 5:
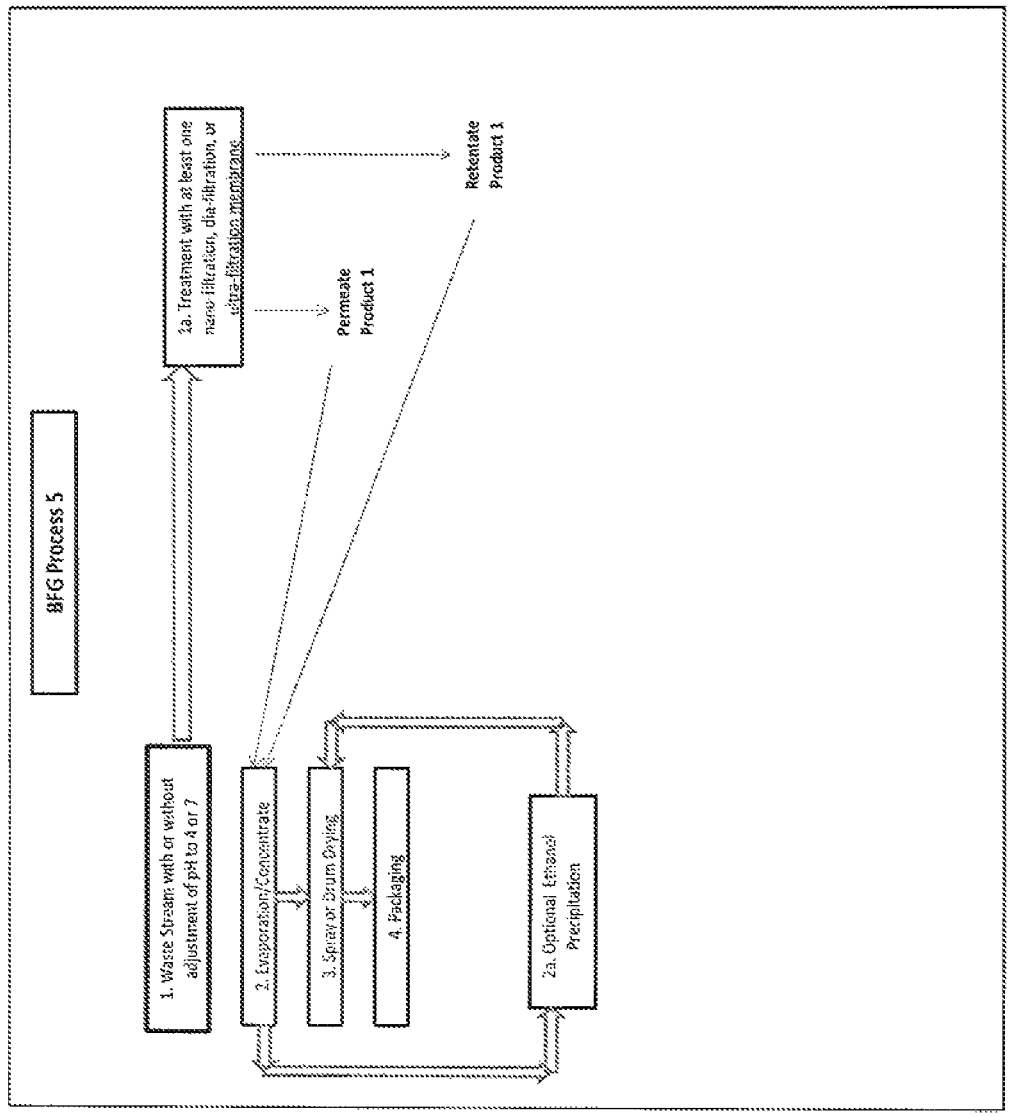
FIG. 5 shows a simplified version of part of FIG. 1 which is a diagram of one of our novel processes for producing semi-pure and purified Bio-based Fiber Gums from alkaline extracts of agricultural products or agricultural by-products (e.g., corn bran) which includes processes including treatment with at least one nano-filtration or ultra-filtration membrane or diafiltration membrane to produce semi-pure or purified unique fractions with components separated by molecular weight followed by either ethanol precipitation, spray drying, or drum drying as described below. Those made without ethanol precipitation are at least semi-pure mixtures of BFGs whereas those made with ethanol precipitation are purified BFGs.

Semi-purified mixtures prepared by use of processes depicted in FIGS. 1, 2, and 5 are also representatives of the "a" class above, and had higher percentages of arabinoxylan than the crude mixtures noted above. Semi-purified mixtures purified with filtration membranes had components that were characterized by specific molecular weight ranges. For instance, semi-purified BFG compositions in the retentate fraction prepared by the process depicted in FIG. 2, using a 10,000 Dalton MWCO (Sample M), contained the components mentioned above except for all soluble components, including salts, phenolic acids, oligosaccharides, and proteins with molecular weights less than about 10,000 Daltons (e.g., <10,000 Daltons).

Novel compositions and mixtures that represent the "b" class as described above (containing primarily non-BFG components) are represented in the permeate fractions from ultrafiltration membranes as depicted in FIGS. 1, 2, and 5, for instance samples N, P, and R. Sample N was the permeate from a 10,000 Dalton MWCO membrane and contained primarily all soluble components from the original solution with molecular weights less than about 10,000 Daltons (e.g., <10,000 Daltons), including salts, phenolic acids, oligosaccharides, and proteins. Sample P was from the permeate of a 50,000 Dalton MWCO membrane and contained a similar mixture to sample N except that it contained all soluble components from the original solution with molecular weights less than about 50,000 Daltons (e.g., <50,000 Daltons), including salts, phenolic acids, oligosaccharides, and proteins. Sample R was from the permeate of a 100,000 Dalton MWCO membrane and contained a similar mixture to sample N and P except that it contained all soluble components from the original solution with molecular weights less than about 100,000 Daltons (e.g., <100,000 Daltons), including salts, phenolic acids, oligosaccharides, polysaccharides, and proteins. As noted above, Samples N, P and R, are useful as deicers, fertilizers, antioxidants, and prebiotics for animal feeds and, with de-salting, are used as human prebiotics.

3. The same classes of products, pure BFGs, semi-pure BFGs of both class "a" and "b", and crude BFGs, described in 1 and 2 above but made by alkaline extraction of agricultural products and/or lignocellulosic agricultural by-products (e.g., corn bran/fiber or other bran/fiber samples such as oat bran, wheat bran, barley straw and hull, sugar cane bagasse, corn stover, wheat straw, sorghum bran) and lignocellulosic energy crops such as switchgrass and miscanthus using similar processing.

Novel uses of the compositions described herein include but are not limited to the following: petroleum coke pellet binding agent (see FIG. 6); coal pellet binding agent; binding agent for animal or pet feed pellets; water-based paint emulsifier; oil-in-water emulsifier (food and non food), see Table 7, 8, and 9; water-in-oil emulsifier (food and non food) for pastes, greases and other non-food products; friction reducer; ore binder (pelletizing); adhesive for various applications including use in softwood plywood manufacturing where it may be a good replacement for phenol formaldehyde resin, a known carcinogen and respiratory irritant; other adhesive applications include use for adhesives for paper, paper board, cardboard, porous material such as pottery, plastics, and related items; antimicrobial; ceramics binder; drilling mud; microencapsulation; antioxidant (ORAC) (see Table 10) prebiotic with antioxidant and other healthful properties; soluble dietary fiber with antioxidant and potential cholesterol lowering activity by two methods (soluble fiber plus phytosterols); encapsulating agent with natural antioxidant activity to protect flavors, vitamins, omega 3, and other unsaturated fatty acids, and any other fragile and/or oxidation-prone compounds or materials; de-icing agents (sodium and calcium salts generated from de-salting processes); fertilizers (potassium salts generated from de-salting processes); binder for taconite ore pellets; and binder for zirconium dioxide or other minerals in the manufacturing of ceramics.

Novel uses of the compositions described herein also include chemicals for use in oil and natural gas hydrofracturing (fracking) applications. In oil and natural gas field drilling applications, this mixture will have a number of useful properties including use as a drilling-fluid viscosifier due to its unique rheological properties that enhance hole fragment cleaning and suspension, as an aid in reducing fluid loss, and as a hydrostatic pressure controller to avoid blow-outs and gushers. It will be useful to suspend and transport propants during hydraulic fracturing and gravel packing due to its ability to thicken water efficiently at moderate concentrations. It will also function simultaneously as a lubricant, friction reducer, and viscosity controller.

Novel uses of the compositions described herein also include charcoal and biochar binder. Surprisingly it can also be used in making briquettes and pellets from charcoal and biochar. The mixture serves as a binder to hold the chars together rather than using a more expensive resin or starch binder. Our work done on petroleum coke pellet binding showed these new products to be useful to bind carbonaceous materials into strong pellets.

Novel uses of the compositions described herein also include coke-water slurry or coal-water slurry stabilizer or suspending agent. Use of the mixture as a viscosifier and emulsifier can stabilize coke or coal-water slurries which helps in transporting coal and reducing harmful emissions into the atmosphere, thus making the coal explosion-proof, and could facilitate the use of these slurries as the equivalent of a liquid fuel (e.g., heating oil and diesel fuel) or gas to generate steam to run turbines or crack petroleum in refineries.

Unless defined otherwise, all technical and scientific terms used herein have the same meaning as commonly understood by one of ordinary skill in the art to which the invention belongs. The term "about" is defined as plus or minus ten percent; for example, about 100° F. means 90° F. to 110° F. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Composition of unique crude mixtures, semi-purified, and purified corn or oat bran-derived bio-based fiber gums: The composition of several new products produced as described above is shown in Table 1. Table 1 shows data for the bio-based fiber gum made from a Z-Trim "waste stream", an alkaline extract of corn or oat bran that was treated by evaporation and either ethanol precipitation, spray drying or drum drying, with or without pH adjustment first as described above. All crude and semi-pure fractions, whether they were pH adjusted or not, or whether they were ethanol precipitated or drum dried or spray dried after evaporation, clearly contained considerable non-BFG components including ash (from alkali and mineral acids), proteins, starch, neutral detergent fiber (NDF), and in some cases crude fat, whereas pure arabinoxylans (e.g., such as corn fiber gum prepared by U.S. Pat. No. 6,147,206) contained very low ash, protein, crude fat, starch, and NDF. We are also finding that BFG prepared by ultrafiltration, diafiltration, and other purification methods to remove non-BFG components prior to evaporation and spray drying or drum drying also had low levels of ash, protein, crude fat, starch, and NDF (Table 1).

These new mixtures and purified materials have many novel uses as described above and below. We found that the crude and semipurified gum mixtures from corn or oat bran were excellent oil-in-water emulsifiers as described below.

Example 1

Use of crude, semi-purified and purified BFG and mixtures from corn or oat bran or other biomasses as emulsifiers of oil-in-water. Emulsion preparation: The sample for emulsification was prepared with 1:4 ratio of bio-based fiber gum to medium chain triglycerides (MCT) containing 0.1% sodium benzoate and 0.3% citric acid. The emulsification was performed on small (10 g) and large (30 g) scales depending upon sample availability. A stock solution of BFG made from corn bran (27.78 mg/g solution) containing 0.1% (w/w) sodium benzoate (a preservative) and 0.3% (w/w) citric acid was prepared for the emulsification study by slowly adding the calculated amount of gum sample a little at a time with vigorous stirring to a solution of sodium benzoate and citric acid in water at room temperature and then gently stirring overnight to produce a hydrated, well dissolved and homogeneous solution. The samples for oil-in-water emulsions were prepared in triplicate for each sample by taking 9 or 27 g (small or large scale) of the above gum stock solution and 1 or 3 g (small or large scale) of medium chain triglyceride (MCT) in a glass vial. The emulsification performance of gum samples (e.g., guar gum, xanthan gum, CMC, etc.) with low solubility was also tested with the same 1:4 ratio of gum to MCT, but at 10 times less concentration of each ingredient. No weighting agent was added during emulsion preparation to avoid the effects of such agent on the emulsification process. The solution was vortexed and then homogenized using a polytron bench top homogenizer equipped with a 12 mm diameter head (Brinkmann, Switzerland, PT 10/35) at 20,000 rpm for 3 min. The above homogenized emulsion was passed through an EmulsiFlex-B5 high-pressure homogenizer (Avestin Inc., Canada) at 20,000 psi homogenization pressure 3 times to prepare the final emulsions. The particle size distribution of the emulsions was measured using a laser diffraction particle size analyzer (Horiba LA-950). The emulsification effectiveness was evaluated on the initial particle size of the emulsion at 0 time. The emulsion stability was determined after storing emulsions at 60° C. (accelerated aging test) for 3 and 7 days. Good emulsions were those which had the smallest particle sizes. The most stable emulsions were those whose particle sizes stayed small throughout the test period.

Emulsion Testing Results: Using the methodology described above, Table 7 shows that the "gold standard" commercial gum arabic was the best and most stable emulsifier. The particle sizes ranged from 2-4 µm throughout the testing period. Pure corn fiber gum made by U.S. Pat. No. 6,147,206 was also an excellent emulsifier, being similar to gum arabic. Negative controls, such as low levels of CMC (carboxymethyl cellulose) or guar gum, exhibited large emulsion particle sizes and thus produced unstable, poor emulsions.

Crude, non-pH adjusted (pH 11.8), spray dried or drum dried bio-based fiber gum from corn bran, Samples B and C, surprisingly provided a relatively good and stable emulsion (Table 8. Ethanol precipitated product from the pH 11.8 sample (Sample A) was also surprisingly an effective emulsifier but not quite as good as the spray and drum dried samples. Crude, pH 7 adjusted, ethanol precipitated, spray dried, or drum dried, bio-based fiber gum from corn bran (Samples D, E, and F) were not as effective as the pH 11.8 products but they were still surprisingly better than Guar and CMC. Similarly Crude, pH 4 adjusted (with Hemi. A and Hemi. A removed), ethanol precipitated, spray dried, or drum dried, bio-based fiber gum from corn bran (Samples G, H, I, J, K, L) were not as effective as the pH 11.8 products but they were still surprisingly a lot better than the commercial Guar and CMC. The three spray dried retentates (Samples M, O and Q) processed by ultrafiltration membranes of molecular weight cut off 10, 50 and 100 K Daltons respectively were comparatively better emulsifiers than their respective permeates (Samples N, P and R) and also commercial Guar and CMC as expected. The pure BFG prepared from original (unconcentrated) corn Z Trim WS by ethanol precipitation after removing Hemi. A (Sample S) was very surprisingly as good as gold standard commercial gum Arabic and very pure CFG (Table 7). The corn BFG prepared by diafiltration of corn Z Trim WS by using 125 K Dalton membrane (Sample T) was superior to crude BFG prepared from oat Z Trim WS by spray and drum drying (Samples W and X) and far superior than similarly prepared BFG from oat Z Trim WS by diafiltration using 125 K Dalton membrane.

The emulsions stability of very pure BFGs prepared from corn bran, corn stover, rice fiber, wheat straw, switch grass, miscanthus, sugarcane bagasse, and sorghum bran (Burgundy milled) (Table 9) was very surprisingly as good as the gold standard gum arabic and very pure CFG (Table 8). The emulsions stability of BFGs prepared from wheat bran, sorghum bran (Black milled), and sorghum bran (sumac milled) (Table 9) was not as good as the BFGs prepared from other biomasses; without being bound by theory, a slightly inferior emulsions stability of these BFGs might be due a high ash content present in them (Table 5). If these BFGs will be processed to remove most of their ash, they might be as good emulsifier as BFGs isolated from other biomasses.

Example 2

Use of crude, semi-purified, and pure BFGs and mixtures as binding agents for petroleum coke pellets: To demonstrate the effectiveness of the bio-based fiber gums (BFG) as binders for petroleum coke pelletization, pellets were produced using binders typically used in this application and they were compared to pellets made using our novel BFG binders. The pellets produced were analyzed and compared.

Pelletizing Procedure: Petroleum coke pellets containing 0.8% binder were prepared by placing 2.5 kg of petroleum coke fines and 20 g of binder into a 3 kg capacity Eirich pelletizer. Pellets containing higher binder concentrations were made by decreasing the amount of coke and increasing the amount of binder in order to produce the desired concentrations. Mixing was done for 2 minutes with the bowl turning clockwise (cw) at 90 Hz and the agitator turning cw at 30 Hz. The bowl direction was then reversed to counter clockwise (ccw) and the speed reduced to 50 Hz. Water was added slowly with mixing for an additional 2 minutes. Each type and concentration of binder tested required a different amount of water addition that was dependent on the amount and properties of the binder. The range of water addition was from 140 mL to 475 mL. After water addition, the bowl speed was reduced to 40 Hz and mixed for 1 minute and then reduced again to 30 Hz and mixed for 1 additional minute. The pelletizer was then stopped and emptied to recover the pellets. Pellets were then dried in a Thelco oven at 105° C. for 4 to 6 hours before being removed and allowed to cool completely.

Compression Force Measurement: The compression force required to break the pellets was measured using a Chatillon LG-050 Mechanical Force Gauge. The amount of compression force required to break the pellet was proportional to the effectiveness of the binder. A minimum of 5 psi was used as the lowest acceptable strength necessary to pass the test. In this test, the most effective binding agents resulted in pellets requiring the highest compression force to break.

Figure 6:
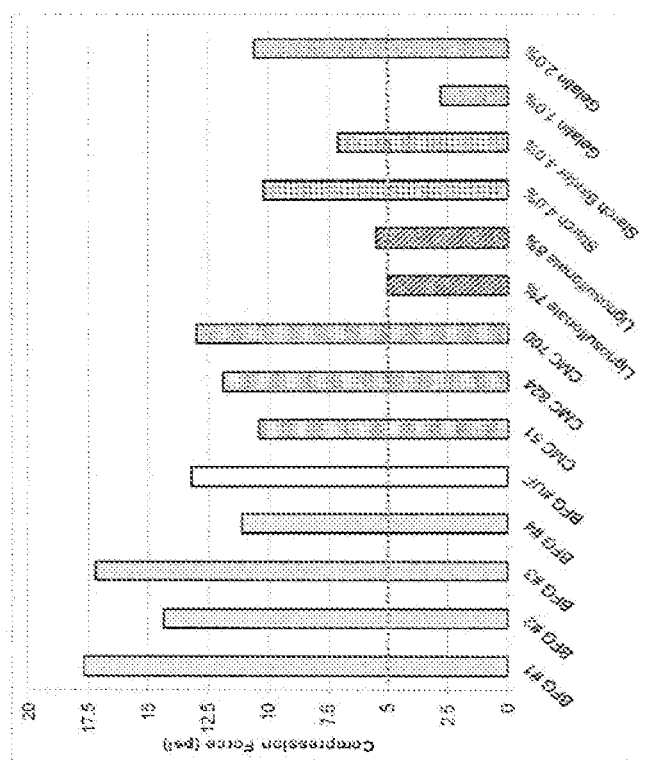
FIG. 6 shows compression test measurements of petroleum coke pellets produced using different binders as described below. Binders were added at 0.8% with the exception of lignosulfonate, starch, starch binder and gelatin which were used at the indicated levels. The dashed line at 5 psi indicates the minimum acceptable level for the pellets.

Results: FIG. 6 shows the results of the compression force measurements for the pellets that were produced using the different binders. BFG #1 was BFG isolated by drum drying of pH 11.8 preparation, Sample C as defined in Table 1. BFG #2 was BFG isolated by drum drying of pH 7.0 preparation, Sample F. BFG #3 was BFG isolated by spray drying from pH 11.8 preparation, Sample B, and BFG #4 was BFG isolated by spray drying from pH 7.0 preparation, Sample E. BFG #UF was biobased fiber gum isolated by ultra filtration and drum drying. CMC 51 was carboxymethyl cellulose. CMC 824 was carboxymethyl cellulose. CMC 700 was carboxymethyl cellulose. Lignosulfonates were a commercial byproduct from wood pulping. Starch was commercial unmodified starch. Starch binder was Uniscope Starch Binder™, a modified food grade starch binder.

With the exception of gelatin at 1%, all of the binders tested passed the minimal compression force test. Surprisingly the crude BFG samples (BFG #1-4) and the purified BFG sample (BFG #UF) gave better results than the other materials commonly used for this application. BFG #1 was isolated by drum drying of pH 11.8 preparation as described above (Sample C). BFG #2 was isolated by drum drying of the pH 7.0 adjusted waste stream as described above (Sample F). BFG #3 was isolated by spray drying from pH 11.8 waste stream (Sample B) and BFG #4 was isolated by spray drying from pH 7.0 waste stream as described above (Sample E). The BFG #UF sample was prepared by the ultrafiltration process described in FIG. 2 and therefore was more highly purified. Surprisingly, the crude mixtures, Samples B, C, E, and F, on average were more effective than the more purified sample. However, all were surprisingly excellent binders. The BFG samples surprisingly resulted in higher compression force measurements than the lignosulfonate, starch, starch binder, and the gelatin-treated samples. Three types of CMC (carboxymethyl cellulose), CMC 51, 824 and 700, were tested and gave acceptable measurements of 10.4, 11.9, and 13.0 psi respectively. All of the BFG samples, with the exception of BFG #4, surprisingly gave superior performance relative to the CMC samples. BFG #4 surprisingly gave a compression force of 11.1 which was a higher compression force measurement relative to CMC 51 but slightly lower than the other two CMC samples.

When comparing the amount of binder necessary to meet the minimal compression force measurement, the BFG samples were also surprisingly superior to the other types of binders tested. Only the CMC binder could be used at a comparable level and still meet the minimal compression criteria. Because CMC is a "gold standard" binder for these applications, and these BFGs and BFG mixtures were surprisingly equivalent or superior as binders, these BFGs were surprisingly good binding agents for this and any other application which requires binding of carbonaceous materials such as charcoal, coal powder, pyrolysis bio-char, graphite, and other like materials.

Example 3

Production of novel BFG compositions with antioxidant properties: There are many examples of needs for novel compositions that can serve to protect foods and non-food products against oxidative damage due to free radicals, oxygen, ozone, and other deleterious environmental agents. BFG compositions with the simultaneous ability to emulsify, encapsulate, or form a protective film on valuable products that are sensitive to oxidation, such as vitamins, omega-3 polyunsaturated fatty acids, fish oils, medicines, paint pigments, and the like, should be useful for protecting these sensitive materials. We found that our BFG compositions surprisingly not only had the ability to emulsify, encapsulate, and form films on these sensitive oxidation-prone materials, but also surprisingly had the ability to prevent oxidation due to their antioxidant properties. One way to measure the antioxidant power of compositions, foods, and plant phytochemicals is to determine the ORAC (Oxygen Radical Absorbance Capacity) value of the composition. This test provides an overall measure of a material's antioxidant activity. The higher the ORAC score, the greater the material's antioxidant capacity. The novel compositions cited herein were tested by a commercial laboratory using the following published procedures: Huang, D., et al., J. Agric. Food Chem., 50: 1815-1821 (2002); and Ou, B., et al., J. Agric. Food Chem., 50: 3122-3128 (2002). The results are shown in Table 10.

Results: Surprisingly, crude BFGs isolated by simply evaporating the samples with or without pH adjustment followed by spray drying (Samples B, E and I) gave hydrophilic ORAC values from about 134,000 to about 170,000 micromole Trolox equivalency (TE) per 100 gram of product. ORAC values can be appreciated by understanding that compositions containing low amounts of antioxidants, such as boiled sweet potato, have ORAC values less than 800 (µmol TE/100 grams) whereas compositions with the highest ORAC values ever tested, such as ground cloves, have ORAC values as high as about 300,000. These data indicated that BFG compositions such as those in samples B, E and I surprisingly had extremely high levels of antioxidants, even higher than dry cocoa powder which has a value in the range of 50,000. Interestingly, corn bran, from which the BFGs were all prepared, surprisingly had a much lower hydrophilic ORAC value of about 2,000 which is considerable but much less than the values of the crude BFG mixtures (134,000 to about 170,000 µmol TE/100 g) and pure BFG (Hemi. B, 7,093 µmol TE/100 g) isolated from it. Also, purified BFG (hemicellulose B) recovered from the corn waste-stream starting material (Sample S) surprisingly also had hydrophilic ORAC values that was higher than corn bran. Interestingly, pure corn fiber gum prepared by U.S. Pat. No. 6,147,206 had a higher hydrophilic ORAC value than the pure BFG hemicellulose B (sample S) prepared by the processes described herein (again showing that these compositions were different from known compounds). The hydrophilic ORAC values of pure BFGs (Hemi. B) isolated from corn stover, rice fiber, wheat bran, wheat straw, switch grass, miscanthus, and sugarcane bagasse were surprisingly higher than their respective original biomasses (Table 10) indicating that more antioxidant containing BFG products can be solubilized and made available by the present alkaline process. Our results also indicated that all sorghum brans were extremely rich in antioxidant (ORAC Value: 24,000-78,000 µmol TE/100 g) and a very high amount of that (18,000-30,000 µmol TE/100 g) can be preserved on their BFGs by the alkaline extraction used for their isolation.

In summary, these BFG mixtures and purified BFGs surprisingly had extremely high ORAC levels, much higher than the materials they were prepared from and much higher than items known to have high levels of antioxidants, such as cocoa. Thus the unique mixture of oligosaccharides, polysaccharides, salts, phenolic acids, and other lipids present in our crude compositions combined to give a surprisingly high level of antioxidants, as measured by the ORAC value, and were therefore novel and useful materials. The high ORAC values of the purified BFGs were also surprising, especially those from wheat bran, corn stover, switch grass, and miscanthus. All these BFGs were powerful antioxidants as well as being rich (over 80%) in soluble dietary fiber (Table 6). Human consumption of such materials could be beneficial for prevention of heart disease. A very high ratio of ORAC content of very highly antioxidant rich sorghum brans can be preserved on their BFGs by using the current alkali isolation technology.

Example 4

Encapsulation of oils using BFG. Method: Samples were prepared by first producing a 5% solution of BFG or Gum Acacia in water. The BFG or Gum Acacia solution was then mixed with natural orange oil and homogenized using a rotor/stator high-sheer mixer. The solution was then pumped into a spray dryer using an ultrasonic vibrating nozzle at 1-2 mL per minute to produce the encapsulated oil. The results and specific drying conditions used are given in Table 14.

Results: Thermal gravimetric analysis was used to determine the loadings of all samples by measuring the amount of volatilization (weight loss) of the encapsulated material below 200° C. Above 200° C., the Gum Acacia and the BFG began to decompose. The comparison of the encapsulated samples showed that at lower oil loadings tested, the two BFG samples performed very similarly to Gum Acacia in their usefulness as an encapsulating agent. Gum Acacia was a good representative standard for encapsulation used. At the higher loading level tested, the samples still performed well; however, the loadings were somewhat less than Gum Acacia. The recovered material was higher for the BFG samples relative to that of the Gum Acacia samples. This indicated that with optimization of temperature and oil loading that the BFG can be used as an effective encapsulating agent.

Example 5

Use of BFG as a Partial Phenol-Formaldehyde (PF) Resin Replacement in Softwood Plywood Manufacture: Phenol-Formaldehyde (PF) resins are used in the manufacture of plywood. These resins are relatively expensive, can be relatively toxic to those exposed to it, and may contain considerable amounts of fossil-derived ingredients. Crude, semi-purified, and purified BFGs and their unique mixtures prepared according to procedures herein were tested to see if they could substitute for some of the PF resins used in softwood plywood manufacture. This is a very material development in view of problems of formaldehyde emission control by effective scavenging and managing routine problems of viscosity control and cure time in a panel manufacturing plant. If BFGs have acceptable properties, these natural, renewable, and non-toxic products could help replace some of the less desirable PF resins in plywood manufacture.

Tests of resin physical properties: All testing and reporting below was done by a commercial lab (Forintek Canada Corp) which provided and prepared all the materials except for BFG product. These materials include Douglas fir plywood veneers, a commercial PF resin, soda ash, wheat flour, and filler. Tests were conducted by the commercial laboratory for physical properties of the corn-bran BFG which included pH, viscosity, gel time, and solids %. As a control, a commercial plywood PF resin was also tested for these properties. Results are given in Table 15.

Manufacture and tests of plywood panels: A Control glue mix was constructed containing typical components for plywood panels (Table 16). Four experimental glue formulations were constructed using BFG to substitute for 10 or 20% of the PF resin (Table 16). Initial experiments on 15×15 inch test panels showed that glue mix 4a, with 10% BFG substitution, functioned similar to the Control glue mix. This mixture 4a was then used for subsequent studies. Next, six experimental 3-ply plywood panels (Panels E1-E6) were produced using Douglas fir veneers and the glue mix 4a containing BFG at replacement level of 10% PF resin solids at two different press temperatures. Three control 3-ply plywood panels (Panels C1-C3) were also produced using a commercial phenolic glue mix shown in Table 16. Thus, a total of 9 plywood panels were manufactured according to the following parameters:

| | |
|---|---|
| Board dimension | 34" × 24" |
| Commercial PF resin | Cascophen BC W2021 |
| Glue mix loading rate | 35 lb /1000 ft$^2$ (SGL) |
| Plywood veneers | Douglas fir |
| Press platen temperature | 300° F. and 400° F. |
| Press times | 270, 300 and 330 seconds for C1 . . . C3 (at 300° F.) |
| | 270, 300 and 330 seconds for E1 . . . E3 (at 300° F.) |
| | 270, 300 and 330 seconds for E4 . . . E6 (at 400° F.) |

The resulting plywood panels were tested for wood failure and shear strength using procedures specified by the American Voluntary Product Standard for Construction and Industrial Plywood PS 1-95. The test involved vacuum/pressure treatment in water and boil-dry-boil treatments. Wood failure is the rupturing of wood fibers in the shear strength tests on bonded specimens, usually expressed as the percentages of the area involved that shows such failure. High wood failure % usually indicates strong glue bond. A summary of the test data is shown in Table 17.

The tests showed that all panels produced at 300° F. (i.e., C1 . . . C3 and E1 . . . E3) had reasonable good shear strengths. Wood failure % values were also high except for those of panel E1 which was produced at short press time (270 seconds). These tests indicated that the flue mix with 10% BFG substitution of the PF resin was capable of producing satisfactory bond strength but at a somewhat slower cure speed. This was also consistent with the observation that wood failure % (See E1 and E4 data) was greatly improved at a higher press temperature (400° F.) for the short press time. Examining panels E4-E6 showed that satisfactory bond strength could be obtained at higher press temperatures provided that the press time was not too long, as in the cases of E4 and E5. At extended press times (330 seconds), however, high press temperature seemed to be detrimental to the performance of BFG, as shown in the case of E6 where wood failure % was drastically reduced.

Conclusion: BFG can readily substitute for 10% of a commercial phenol-formaldehyde resin BCW2021 in the manufacturing of 3-ply exterior grade plywood from Douglas fir veneers. Satisfactory bond strengths were obtained. It is quite likely that higher substitution levels of BFG could be achieved with more optimized formulation and processing conditions.

Example 6

Use of BFG as a binder for Briquettes. Method. Charcoal briquettes were made using a mixture of ground hardwood char (90%) and sawdust (10%) with gelatinized starch or BFG as a binding agent. The starch binder was gelatinized by cooking in water to prepare a 30% starch paste and was then mixed into the wood char/sawdust mixture at 6-7% of the dry material weight. The BFG binder was either mixed into the wood char/sawdust mixture and water added to activate the binder or prepared as a solution and then added. The BFG was used at 2-2.5% of the dry material weight. After the mixtures were prepared in a mixer, briquettes were made by weighing 25 grams of the mixture into a mold and compressed using a hydraulic press for 30 seconds at 1000 psi. The mold used was approximately 1 inch by 2 inches with the height of the final briquettes about 2.5 inches. The wet briquettes were dried in an oven at 105° C. for 15 hours. Quality of the briquettes was determined using a puncture test to measure the strength of the briquettes. This was done using a 5 mm probe and an Instron texture analyzer on the fresh (green) and the dry briquettes. Five replicates for each mixture were made and the results averaged. Results are shown in Table 18.

Results: The strength of the briquettes for all mixtures tested increased significantly on drying. When starch was used as the binder (considered the control), it resulted in the highest green and dry strengths relative to the BFG sample tested. The BFG #1 samples (added wet and added dry and water activated) were done using less than one third the amount of binder that was used in the starch control. The BFG briquettes were not as strong as the starch briquettes; however, they were sufficiently strong to produce a viable product. The BFG#2 material used was added at 2.5% of the dry material weight and produced a much stronger briquette relative to the lower levels used with the BFG#1 sample. It is clear that increasing the BFG additive to a higher level would result in an even stronger final product.

All of the references cited herein, including U.S. patents, are incorporated by reference in their entirety. Also incorporated by reference in their entirety are the following references: U.S. Pat. No. 5,766,662; U.S. Pat. No. 6,147,206.

Thus, in view of the above, the present invention concerns (in part) the following:

A process for the preparation of bio-based fiber gums comprising (or consisting essentially of or consisting of):

(a) mixing agricultural materials with a heated alkaline solution at temperatures in the range of about 75° to about 150° C. to form a slurry;

(b) separating out the insoluble components from said slurry to yield a solution having a pH of about 9 to about 14 wherein said solution contains about 0.1 to about 10 wt % solids wherein said solids are alkaline soluble fractions;

and one of the following:

(c) evaporating said solution to about 16 to about 23 wt % solids and drying to a powder;

(d) adjusting the pH of said solution to a pH of about 2 to about 12, evaporating said solution to about 16 to about 23 wt % solids and drying to a powder;

(e) evaporating said solution to about 16 to about 23 wt % solids, adjusting the pH of said solution to a pH of about 2 to about 12 and drying to a powder, (f) evaporating said solution to about 16 to about 23 wt % solids and precipitating out said soluble components with about two to about five volumes of solvent to form a precipitate and a supernatant, and separately drying said precipitate and said supernatant;

(g) evaporating said solution to about 16 to about 23 wt % solids, adjusting the pH of said solution to a pH of about 2 to about 12 and precipitating out said soluble components with one to five volumes of organic solvent to form a precipitate and a supernatant, and separately drying said precipitate and said supernatant;

(h) adjusting the pH of said solution to a pH of about 2 to about 12, evaporating said solution to about 16 to about 23 wt % solids and precipitating out said soluble components with about one to five volumes (preferably about 2 volumes of ethanol) of organic solvent (ethanol), to form a precipitate and a supernatant, and separately drying said precipitate and said supernatant; or (i) adjusting the pH of said solution to a pH of about 2 to about 5 (preferably to about 3.5 to 4.5) to precipitate Hemicellulose A and the remaining solution is treated with about 2 volumes of solvent (ethanol) to form a precipitate and a supernatant, and separately drying said precipitate and said supernatant; and optionally the solution is pretreated with at least one of the following:

(1) de-salting said solution and the de-salted solution becomes the solution;

(2) processing the solution through at least one nano-filtration membrane or ultra-filtration membrane or diafiltration membrane and the permeate becomes the solution; or (3) processing the solution through at least one nano-filtration membrane or ultra-filtration membrane or diafiltration membrane and the retentate becomes the solution.

The above process, wherein said drying is by drum drying or spray drying.

The above process, wherein said process does not utilize oxidizing agents. The above process, wherein said oxidizing agents are selected from the group consisting of hydrogen peroxide, sodium hypochlorite, and mixtures thereof.

The above process, wherein said agricultural materials is selected from the group consisting of corn bran, corn fiber, oat bran, oat fiber, wheat bran, wheat fiber, barley straw and hull, switchgrass, sugar cane bagasse, miscanthus, corn stover, wheat straw, sorghum bran and mixtures thereof.

The above process, said process comprising (or consisting essentially of or consisting of):

(a) mixing agricultural materials with a heated alkaline solution at temperatures in the range of about 75° C. to about 150° C. (preferably in the range of about 85° to about 90° C.) to form a slurry;

(b) separating out the insoluble components from said slurry to yield a solution having a pH of about 9 to about 14 (preferably in the range of about 10 to about 12) wherein said solution contains about 0.1 to about 10 wt % solids wherein said solids are alkaline soluble fractions; and at least one of the following:

(c) evaporating said solution to about 16 to about 23 wt % solids and drying to a powder;

(d) adjusting the pH of said solution to a pH of about 2 to about 12 (preferably to a pH of about 4 to about 10 and more preferably to a pH of about 4 to about 7), evaporating said solution to about 16 to about 23 wt % solids and drying to a powder;

(e) evaporating said solution to about 16 to about 23 wt % solids, adjusting the pH of said solution to a pH of about 2 to about 12 (preferably to a pH of about 4 to about 10 and more preferably to a pH of about 4 to about 7) and drying to a powder;

(f) evaporating said solution to about 16 to about 23 wt % solids and precipitating out said soluble components with about two to about five volumes (preferably about 2 volumes) of organic solvent (ethanol) to form a precipitate and a supernatant, and separately drying said precipitate and said supernatant;

(g) adjusting the pH of said solution to a pH of about 2 to about 12 (preferably to a pH of about 4 to about 10 and more preferably to a pH of about 4 to about 7), evaporating said solution to about 16 to about 23 wt % solids and precipitating out said soluble components with two to about five volumes (preferably about 2 volumes) of organic solvent (ethanol) to form a precipitate and a supernatant, and separately drying said precipitate and said supernatant;

(h) evaporating said solution to about 16 to about 23 wt % solids, adjusting the pH of said solution to a pH of about 2 to about 12 (preferably to a pH of about 4 to about 10 and more preferably to a pH of about 4 to about 7) and precipitating out said soluble components with ethanol to form a precipitate and a supernatant, and separately drying said precipitate and said supernatant;

(i) adjusting the pH of said solution to a pH of about 2 to about 5 (preferably to about 3.5 to 4.5) to precipitate Hemicellulose A and the remaining solution is treated with 2 volumes of organic solvent (ethanol) to form a precipitate and a supernatant, and separately drying said precipitate and said supernatant; and optionally the solution is pretreated with at least one of the following:

(1) processing the solution through a 10,000 Dalton MWCO ultrafiltration membrane and the permeate becomes a solution containing alkaline soluble fractions with molecular weight<10,000 Daltons useful for a variety of uses including de-icers, prebiotics, etc. after they are evaporated and dried;

(2) processing the solution through a 10,000 Dalton MWCO ultrafiltration membrane and processing the retentate through a 50,000 Dalton membrane and the permeate becomes a solution containing alkaline soluble fractions with molecular weights between 10,000 and 50,000 Daltons useful for a variety of uses including de-icers, prebiotics, etc. after they are evaporated and dried;

(3) processing the solution through a 10,000 Dalton MWCO ultrafiltration membrane and processing the retentate through a 50,000 Dalton MWCO membrane and processing the retentate through a 100,000 Dalton MWCO membrane and the permeate becomes a solution containing alkaline soluble fractions with molecular weights between 50,000 and 100,000 Daltons useful for a variety of uses including de-icers, prebiotics, etc. after they are evaporated and dried;

(4) processing the solution through a 10,000 Dalton MWCO ultrafiltration membrane and processing the retentate through a 50,000 Dalton MWCO membrane and processing the retentate through a 100,000 Dalton MWCO membrane and the retentate becomes a solution containing alkaline soluble fractions with molecular weight greater than 100,000 Daltons which once dried is a purified BFG;

(5) processing the solution through a 10,000 Dalton MWCO ultrafiltration membrane and processing the retentate through a 50,000 Dalton MWCO membrane and processing the retentate through a 100,000 Dalton MWCO membrane and adjusting the pH of the retentate to a pH of about 2 to about 5 (preferably to about 3.5 to 4.5) to precipitate out a precipitant which is then dried to yield hemicellulose-A and the remaining solution contains a BFG product (hemicellulose-B) with a molecular weight greater than 100,000 Dalton and is soluble at all pH values;

(6) processing the solution through a 10,000 Dalton MWCO ultrafiltration membrane to form (a) a permeate that is evaporated and dried to yield give a product with molecular weight<10,000 Daltons which is useful as deicers and (b) a retentate which is evaporated and dried to yield a product with molecular weight>10,000 Daltons and which is a semi-purified BFG; or (7) processing the solution through a 50,000 Dalton MWCO ultrafiltration membrane to form (a) a permeate that is evaporated and dried to yield a product with molecular weight<50,000 Daltons which is useful as deicers and (b) a retentate which is evaporated and dried to yield a product with molecular weight>50,000 Daltons and which is a semi-purified BFG; or (8) processing the solution through a 100,000 Dalton MWCO ultrafiltration membrane to form (a) a permeate that is evaporated and dried to yield a product with molecular weight<100,000 Daltons which is useful as deicers and (b) a retentate which is evaporated and dried to yield a product with molecular weight>100,000 Daltons and which is a purified BFG; or (9) processing the solution through a 100,000 Dalton MWCO ultrafiltration membrane to form a retentate containing a product with molecular weight>100,000 Daltons and adjusting the pH of said retentate to a pH of about 2 to about 5 to form (a) a precipitate which is then dried to form hemicellulose-A and (b) a solution containing a product with a molecular weight greater than 100,000 Daltons that is soluble at all pH values (hemicellulose-3) and which is a highly purified BFG;

(10) removing salts and ash from said solution and using the salt- and ash-containing fraction (permeate) for a variety of uses including de-icers, prebiotics, etc.;

(11) removing salts and ash from said solution and evaporating said solution to 16-23 wt % solids and then drying to yield a semi-purified BFG hemicellulose useful for a variety of uses including prebiotics, antioxidant, binding agent, viscofiers, adhesive, etc. after they are evaporated and dried.

(12) removing salts and ash from said solution and adjusting the pH of the solution to a pH of about 2 to about S to form (a) a precipitant which is then dried to form hemicellulose-A and (b) a solution containing semi-purified BFG hemicellulose B (soluble at all pH ranges plus a mixture of other non-ionic materials present in the original solution);

(13) optionally the solution is pretreated by ultrafiltration or diafiltration membrane or nanofiltration with or without pH adjustment before or after said ultrafiltration or said diafiltration membrane or said nanofiltration to form (a) a retentate or retentates which become solutions containing primary semi-purified BFG class "a" products and (b) the resulting permeate or permeates become the solutions containing additional semi-purified BFG class "b" products that can be dried to a powder form.

A product produced by the above process.

A composition comprising (a) a product produced by the above process as a binder and (b) carbonaceous materials.

An oil-in-water or water-in-oil composition comprising (a) a product produced by the above process as an emulsifier, (b) oil and (c) water.

A composition comprising (a) a product produced by the above process as an antioxidant and (b) a material that is oxidizable.

A method of reducing oxidation of a composition that is oxidizable, said method comprising adding the product produced by the above process to a composition that is oxidizable. A method of reducing oxidation of a composition that is oxidizable, said method comprising mixing the product produced by the above process with a composition that is oxidizable.

A method of binding carbonaceous materials, said method comprising adding the product produced by the above process to carbonaceous materials, and pelletizing. A method of binding carbonaceous materials, said method comprising mixing the product produced by the above process with carbonaceous materials, and pelletizing.

A method for stabilizing an oil-in-water or water-in-oil emulsion, said method comprising adding the product produced by the above process to oil and water. A method for stabilizing an oil-in-water or water-in-oil emulsion, said method comprising mixing the product produced by the above process with oil and water.

A method for producing plywood with less phenol-formaldehyde resin, said method comprising adding the product produced by the above process to plywood formulations, pressing and heating.

A method of stabilizing oxidizable material (e.g., oils, flavors, and fragrances), said method comprising adding the product produced by the above process to the oxidizable material to form an emulsion and spray drying to form an encapsulated product.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Proximate composition of bio-based fiber gums (all dry weight basis) made from Corn and Oat Brans

| | Moisture | Ash | Protein | Starch | NDF | Crude Fat | BFG (By mass difference) |
|---|---|---|---|---|---|---|---|
| Alkaline Extract from Corn Bran in Z-Trim Process (Waste Stream—WS), Original pH 11.8 and 0.6-0.9% solids, and: | | | | | | | |
| WS evaporated to 19% solids, and then ethanol precipitated. Sample A | 5.04 ± 0.10 | 32.00 ± 1.10 | 2.10 ± 0.01 | 8.04 ± 0.66 | 2.35 ± 0.31 | ND | 57.9 |
| WS evaporated to 19% solids, then Spray Dried. Sample B | 3.44 ± 0.09 | 39.50 ± 1.45 | 5.69 ± 0.18 | 5.37 ± 0.25 | 1.40 ± 0.08 | ND | 49.5 |
| WS evaporated to 23% solids, then Drum Dried. Sample C | 5.63 ± 0.02 | 40.89 ± 0.33 | 5.47 ± 0.15 | 5.77 ± 0.65 | ND | ND | 47.87 |
| Alkaline Extract from Corn Bran in Z-Trim Process (Waste Stream—WS), Original pH 11.8 and 0.6-0.9% solids but pH adjusted to 7.0 with acid and: | | | | | | | |
| WS (pH 7) evaporated to 20.07% solids, and then Ethanol Precipitated. Sample D | 1.90 ± 0.11 | 22.29 ± 0.09 | 3.73 ± 0.06 | 1.20 ± 0.01 | 2.52 ± 0.06 | 0.79 ± 0.92 | 72.0 |
| WS (pH 7) evaporated to 20.07% solids, and then Spray Dried. Sample E. | 3.05 ± 0.11 | 30.57 ± 2.37 | 5.73 ± 0.04 | 0.97 ± 0.05 | 1.89 ± 0.02 | 0.94 ± 0.02 | 61.8 |
| WS (pH 7) evaporated to 22.74% solids, and then Drum Dried. Sample F. | 5.90 ± 0.06 | 43.63 ± 1.41 | 5.65 ± 0.07 | 0.82 ± 0.03 | 1.17 ± 0.07 | 1.71 ± 0.06 | 48.2 |
| Alkaline Extract from Corn Bran in Z-Trim Process (Waste Stream—WS), Original pH 11.8 and 0.6-0.9% solids but pH adjusted to 4.0 with acid and: | | | | | | | |
| WS (pH 4) Evaporated and ethanol precipitated. Sample G. | 4.05 ± 0.06 | 35.87 ± 0.05 | 3.81 ± 0.03 | 0.43 ± 0.24 | 0.00 | 0.22 ± 0.11 | 59.7 |
| WS (pH 4) Evaporated and Drum Dried. Sample H | 1.97 ± 0.07 | 51.93 ± 0.63 | 4.79 ± 0.06 | 0.63 ± 0.06 | 0.00 | 0.36 ± 0.02 | 42.3 |
| WS (pH 4) Evaporated and Spray-Dried. Sample I | 2.80 ± 0.26 | 49.98 ± 0.48 | 5.24 ± 0.08 | 0.49 ± 0.12 | 0.00 | 0.25 ± 0.14 | 44.0 |

TABLE 1-continued

Proximate composition of bio-based fiber gums (all dry weight basis) made from Corn and Oat Brans

| | Moisture | Ash | Protein | Starch | NDF | Crude Fat | BFG (By mass difference) |
|---|---|---|---|---|---|---|---|
| Alkaline Extract from Corn Bran in Z-Trim Process (Waste Stream—WS), Original pH 11.8 and 0.6-0.9% solids but pH adjusted to 4.0 with acid and Hemi. A removed and then: | | | | | | | |
| WS (pH 4) with Hemi A removed. Evaporated and ethanol precipitated. Sample J | 3.85 ± 0.03 | 41.75 ± 0.04 | 1.79 ± 0.03 | 0.46 ± 0.04 | 0.00 | 0.17 ± 0.03 | 55.83 |
| WS (pH 4) with Hemi A removed Evaporated and Drum Dried. Sample K | 1.98 ± 0.07 | 56.55 ± 0.20 | 3.17 ± 0.11 | 0.37 ± 0.03 | 0.00 | 0.00 | 39.9 |
| WS (pH 4) with Hemi A removed Evaporated and Spray Dried. Sample L | 3.35 ± 0.21 | 54.85 ± 0.27 | 3.18 ± 0.06 | 0.31 ± 0.07 | 0.00 | 0.11 ± 0.02 | 41.55 |
| UF Membrane Processed Samples | | | | | | | |
| Alkaline Extract from Corn Bran in Z-Trim Process (Waste Stream—WS) Original pH 11.8 and 0.6-1.69% solids purified by ultra-filtration as in FIG. 2: Retentate from 10K Dalton membrane, spray dried. Sample M | 4.42 ± 0.08 | 36.77 ± 0.30 | 5.10 ± 0.24 | 0.98 ± 0.12 | 9.35 ± 2.74 | 0.00 | 57.2 |
| Alkaline Extract from Corn Bran in Z-Trim Process (Waste Stream—WS) Original pH 11.8 and 0.6-1.69% solids purified by ultra-filtration as in FIG. 2; Permeate from 10K Dalton membrane. Sample N | 7.15 ± 0.42 | 62.59 ± 0.61 | 3.94 ± 0.05 | ND* | ND* | ND* | 33.56 |
| Alkaline Extract from Corn Bran in Z-Trim Process (Waste Stream—WS) Original pH 11.8 and 0.6-1.69% solids purified by ultra-filtration as in FIG. 2: Retentate from 50K Dalton membrane, spray dried. Sample O | 5.31 ± 0.04 | 34.12 ± 0.84 | 4.75 ± 0.16 | 0.99 ± 011 | 14.43 ± 2.77 | 0.00 | 60.1 |
| Alkaline Extract from Corn Bran in Z-Trim Process (Waste Stream—WS) Original pH 11.8 and 0.6-1.69% solids purified by ultra-filtration as in FIG. 2: Permeate from 50K Dalton membrane. Sample P | 7.25 ± 0.25 | 60.89 ± 0.62 | 3.73 ± 0.07 | ND* | ND* | ND* | 35.47 |
| Alkaline Extract from Corn Bran in Z-Trim Process (Waste Stream—WS) Original pH 11.8 and 0.6-1.69% solids purified by ultra-filtration as in FIG. 2: Retentate from 100K Dalton membrane, spray dried. Sample Q | 6.03 ± 0.03 | 27.31 ± 3.22 | 4.08 ± 0.16 | 2.14 ± 0.07 | 12.37 ± 1.52 | 0.00 | 66.5 |

TABLE 1-continued

Proximate composition of bio-based fiber gums (all dry weight basis) made from Corn and Oat Brans

| | Moisture | Ash | Protein | Starch | NDF | Crude Fat | BFG (By mass difference) |
|---|---|---|---|---|---|---|---|
| Alkaline Extract from Corn Bran in Z-Trim Process (Waste Stream—WS) Original pH 11.8 and 0.6-1.69% solids purified by ultra-filtration as in FIG. 2: Permeate from 100K Dalton membrane. Sample R | 5.56 ± 0.44 | 57.90 ± 0.50 | 4.06 ± 0.09 | ND* | ND* | ND* | 37.50 |
| Purified Bio-Based Fiber Gum (Hemicellulose B) prepared from non-concentrated WS using: ethanol precipitation, Hemicellulose A removal. Sample S. Also called ZTWS-11.55, Hemi. B | 6.42 ± 0.42 | 2.32 ± 0.02 | 0.58 ± 0.00 | 6.04 ± 0.08 | 0.08 ± 0.11 | 0.77 ± 1.10 | 90.29 |
| Corn Bran Gum made from corn bran using prior art hydrogen peroxide process from Yadav, M. P., et al Food Hydrocolloids, 21: 7 (2007) 1022-1030. Sample T. | 6.04 | 2.90 | 0.44 | 0.27 | 0.44 | 0.00 | 96.39 |
| Purified Bio-Based Fiber Gum (Hemicelluloses A and B) prepared from non-concentrated corn Z Trim WS by diafiltration using 125 Dalton membrane. Sample U | 6.98 ± 0.05 | 2.38 ± 0.02 | 1.69 ± 0.05 | 0.44 ± 0.07 | 2.26 ± 2.79 | 0.85 ± 0.27 | 94.64 |
| Purified Bio-Based Fiber Gum (Hemicelluloses A and B) prepared from non-concentrated oat Z Trim WS by diafiltration using 125 Dalton membrane. Sample V | 5.32 ± 0.14 | 8.67 ± 0.03 | 5.28 ± 0.05 | 0.45 ± 0.07 | 0.76 ± 0.29 | 3.44 ± 0.1 | 82.16 |
| Oat Z Trim WS evaporated to 19% solids, then Spray Dried. Sample W | 3.06 ± 0.18 | 54.73 ± 2.74 | 3.60 ± 0.11 | 5.48 ± 0.19 | 1.44 ± 0.07 | 0.00 | 36.22 |
| Oat Z Trim WS evaporated to 26.% solids, then Drum Dried. Sample X | 7.09 ± 0.05 | 54.05 ± 0.32 | 2.28 ± 0.09 | 5.23 ± 0.20 | 5.01 ± 0.36 | 0.00 | 38.49 |

ND = Not Detected.
ND* = Not Determined

TABLE 2

Proximate composition and dietary fiber content of biomasses (all dry weight basis)

| | Moisture | Ash | Protein | Starch | NDF | Crude Fat | ISD | SDF | TDF |
|---|---|---|---|---|---|---|---|---|---|
| 1. Corn bran | 7.87 ± 0.09 | 0.95 ± 0.04 | 6.27 ± 0.06 | 8.97 ± 0.26 | 80.98 ± 0.69 | 3.00 ± 0.10 | 81.9 | 0.3 | 82.3 |
| 2. Corn stover | 6.24 ± 0.03 | 5.43 ± 0.18 | 5.03 ± 0.11 | 0.67 ± 0.05 | 80.67 ± 0.47 | 1.28 ± 0.52 | 83.5 | 3.6 | 87.2 |
| 3. Rice fiber | 4.00 ± 0.07 | 2.41 ± 0.04 | 0.63 ± 0.06 | 0.43 ± 0.07 | 88.54 ± 1.45 | 0.20 ± 0.07 | 93.4 | 3.6 | 97.1 |
| 4. Wheat bran | 10.27 ± 0.02 | 5.66 ± 0.05 | 18.33 ± 0.23 | 21.87 ± 0.73 | 45.44 ± 0.33 | 3.52 ± 0.27 | 41.2 | 3.6 | 44.8 |
| 5. Wheat straw | 1.58 ± 0.09 | 6.07 ± 0.10 | 2.16 ± 0.03 | 0.60 ± 0.10 | 85.72 ± 0.42 | 1.86 ± 0.24 | 85.2 | 2.0 | 87.3 |
| 6. Switch grass | 8.99 ± 0.07 | 2.38 ± 0.11 | 2.08 ± 0.01 | 0.65 ± 0.11 | 87.06 ± 0.03 | 0.86 ± 0.17 | 93.1 | 1.2 | 94.3 |
| 7. *Miscanthus* | 2.09 ± 0.17 | 3.30 ± 0.01 | 1.31 ± 0.04 | 1.54 ± 0.14 | 86.22 ± 1.51 | 0.72 ± 0.10 | 87.2 | 1.6 | 88.9 |
| 8. Sugarcane bagasse | 2.35 ± 0.08 | 11.80 ± 0.05 | 1.64 ± 0.06 | 0.30 ± 0.05 | 90.40 ± 0.75 | 1.00 ± 0.19 | 84.0 | 1.4 | 85.4 |
| 9. *Sorghum* bran (Black milled) | 11.16 ± 0.19 | 4.84 ± 0.04 | 12.36 ± 0.27 | 24.45 ± 0.18 | 35.59 ± 3.28 | 11.68 ± 0.22 | 33.8 | 3.5 | 37.4 |
| 10. *Sorghum* bran (Sumac milled) | 9.64 ± 0.07 | 3.19 ± 0.02 | 12.52 ± 0.18 | 43.67 ± 0.58 | 24.30 ± 2.40 | 7.58 | 25.1 | 2.8 | 27.9 |
| 11. *Sorghum* bran (Burgundy milled) | 10.58 ± 0.04 | 2.35 ± 0.31 | 11.21 ± 0.29 | 48.34 ± 1.66 | 22.30 ± 7.87 | 8.43 ± 0.30 | 23.6 | 1.6 | 25.2 |

ND = Not Determined

TABLE 3

Hemicellulose A and B from biomasses (% Yield, dry weight basis)

|  | Hemi. A | Hemi. B |
|---|---|---|
| 1. Corn bran | 3.98 | 25.13 |
| 2. Corn stover | 19.82 | 8.85 |
| 3. Rice fiber | 11.20 | 2.33 |
| 4. Wheat bran | 14.85 | 14.60 |
| 5. Wheat straw | 22.63 | 4.80 |
| 6. Switch grass | 18.35 | 5.78 |
| 7. *Miscanthus* | 17.03 | 2.56 |
| 8. Sugarcane bagasse | 17.08 | 3.03 |
| 9. *Sorghum* bran (Black milled) | 12.20 | 4.33 |
| 10. *Sorghum* bran (Sumac milled) | 15.73 | 3.13 |
| 11. *Sorghum* bran (Burgundy milled) | 15.63 | 2.87 |

TABLE 4

Proximate composition and dietary fiber content of Hemicellulose A isolated from biomasses (all dry weight basis)

|  | Moisture | Ash | Protein | Starch | NDF | Crude Fat | LSD | SDF | TDF |
|---|---|---|---|---|---|---|---|---|---|
| 1. Corn bran | 1.38 ± 0.16 | 9.22 ± 0.27 | 24.58 ± 0.67 | 3.91 ± 0.48 | 0.00 | 10.98 ± 0.82 | 8.2 | 19.1 | 27.3 |
| 2. Corn stover | 7.95 ± 0.14 | 9.60 ± 0.17 | 13.51 ± 0.48 | 0.42 ± 0.18 | 4.98 ± 0.55 | 3.47 ± 0.37 | 13.6 | 26.0 | 39.4 |
| 3. Rice fiber | 2.38 ± 0.17 | 18.36 ± 0.36 | 4.30 ± 0.11 | 0.37 ± 0.15 | 0.34 ± 0.93 | 0.68 ± 0.74 | 19.2 | 34.8 | 54.0 |
| 4. Wheat bran | 2.66 ± 0.10 | 8.15 ± 0.18 | 37.85 ± 0.67 | 1.43 ± 0.16 | 0.69 ± 0.19 | 13.30 ± 0.48 | 4.3 | 11.2 | 15.6 |
| 5. Wheat straw | 2.43 ± 0.05 | 14.35 ± 0.90 | 4.37 ± 0.35 | 0.45 ± 0.21 | 0.00 ± 0 | 0.79 ± 0.41 | 2.8 | 35.6 | 38.3 |
| 6. Switch grass | 6.39 ± 0.13 | 13.36 ± 0.47 | 4.41 ± 0.17 | 0.60 ± 0.08 | 0.24 ± 0.08 | 1.80 ± 0.15 | 1.6 | 35.4 | 37.0 |
| 7. *Miscanthus* | 0.92 ± 0.1 | 12.42 ± 0.65 | 2.72 ± 0.06 | 0.99 ± 0.06 | 0.00 | 0.00 | 9.5 | 30.4 | 39.9 |
| 8. Sugarcane bagasse | 2.03 ± 0.18 | 20.05 ± 0.56 | 3.84 ± 0.02 | 0.40 ± 0.08 | 0.00 | 0.65 ± 0.40 | 22.5 | 22.4 | 44.8 |
| 9. *Sorghum* bran (Black milled) | 2.09 ± 0.03 | 7.22 ± 1.15 | 38.17 ± 1.32 | 4.29 ± 0.06 | 4.64 | 0.49 ± 0.04 | 69.8 | 4.1 | 73.8 |
| 10. *Sorghum* bran (Sumac milled) | 4.24 ± 0.16 | 8.70 ± 1.36 | 41.23 ± 0.88 | 4.14 ± 0.25 | 0.63 | 0.59 ± 0.08 | 51.5 | 34.1 | 85.6 |
| 11. *Sorghum* bran (Burgundy milled) | 2.34 ± 0.05 | 7.73 ± 0.46 | 44.18 ± 0.05 | 1.53 ± 0.04 | 0.00 | 2.26 ± 0.11 | 38.0 | 10.6 | 48.6 |

TABLE 5

Proximate composition of pure bio-based fiber gums (Hemicellulose B) isolated from biomasses (all dry weight basis)

|  | Moisture | Ash | Protein | Starch | NDF | Crude Fat | BFG (By mass difference) |
|---|---|---|---|---|---|---|---|
| 1. Corn bran | 3.44 ± 0.21 | 2.97 ± 0.04 | 1.20 ± 0.04 | 1.69 ± 0.14 | 0.00 | 0.72 ± 0.12 | 93.42 |
| 2. Corn stover | 5.34 ± 0.14 | 6.92 ± 0.02 | 1.27 ± 0.14 | 1.40 ± 0.05 | 0.26 ± 0.01 | 0.42 ± 0.17 | 89.99 |
| 3. Rice fiber | 7.21 ± 0.32 | 7.69 ± 0.22 | 0.43 ± 0.07 | 0.54 ± 0.11 | 0.00 | ND | 91.34 |
| 4. Wheat bran | 4.21 ± 0.12 | 24.39 ± 0.09 | 8.37 ± 0.29 | 2.36 ± 0.07 | 1.92 ± 0.52 | 0.14 ± 0.13 | 64.74 |
| 5. Wheat straw | 5.36 ± 0.08 | 6.21 ± 0.15 | 0.00 | 0.59 ± 0.12 | 0.00 | 0.80 ± 0.31 | 92.4 |
| 6. Switch grass | 5.02 ± 0.13 | 5.16 ± 0.02 | 1.14 ± 0.08 | 0.90 ± 0.04 | 0.43 ± 0.29 | 1.01 ± 0.48 | 91.79 |
| 7. *Miscanthus* | 4.08 ± 0.33 | 7.10 ± 0.04 | 0.00 | 2.43 ± 0.11 | 0.00 | 1.37 ± 0.45 | 89.1 |
| 8. Sugarcane bagasse | 3.64 ± 0.30 | 5.98 ± 0.06 | 0.00 | 1.98 ± 0.04 | 0.00 | 0.44 ± 0.65 | 91.60 |
| 9. *Sorghum* bran (Black milled) | 5.38 ± 0.30 | 23.45 ± 0.23 | 4.21 ± 0.20 | 1.24 ± 0.15 | 1.92 | 0.80 | 71.10 |
| 10. *Sorghum* bran (Sumac milled) | 3.76 ± 0.13 | 18.37 ± 0.21 | 3.95 ± 0.16 | 1.80 ± 0.08 | 0.75 | 0.00 | 75.88 |
| 11. *Sorghum* bran (Burgundy milled) | 3.58 ± 0.28 | 9.98 ± 0.10 | 4.84 ± 0.03 | 1.22 ± 0.04 | 0.22 | 0.00 | 83.96 |

TABLE 6

Dietary fiber content of pure bio-based fiber gums
(Hemicellulose B) isolated from biomasses (all dry weight basis)

| | ISD | SDF | TDF |
|---|---|---|---|
| 1. Corn bran | 1.4 | 93.6 | 95.1 |
| 2. Corn stover | 0.0 | 87.2 | 87.3 |
| 3. Rice fiber | 1.6 | 90.3 | 91.9 |
| 4. Wheat bran | 0.6 | 60.3 | 61.0 |
| 5. Wheat straw | 0.60 | 93.1 | 93.7 |
| 6. Switch grass | 0.7 | 93.0 | 93.7 |
| 7. *Miscanthus* | 3.2 | 88.0 | 91.1 |
| 8. Sugarcane bagasse | 1.0 | 55.5 | 56.7 |
| 9. *Sorghum* bran (Black milled) | 1.6 | 69.8 | 71.3 |
| 10. *Sorghum* bran (Sumac milled) | 0.8 | 77.9 | 78.8 |
| 11. *Sorghum* bran (Burgundy milled) | 0.9 | 79.4 | 80.3 |

TABLE 7

Demonstration of commercial and other standard gums to
stabilize oil-in-water emulsions. Emulsifier ability determined
by measuring emulsion particle diameter using
laser diffraction particle-size analyzer. Smaller particles indicate
better emulsifiers. (μm)

| Samples—standards and controls | 0 day | 3 Days | 7 Days |
|---|---|---|---|
| CFG (F)* | 2.08 ± 0.58 | 2.40 ± 0.48 | 3.46 ± 2.27 |
| Gum Arabic | 4.74 ± 1.18 | 2.70 ± 0.035 | 2.40 ± 0.12 |
| Guar gum** | 82.27 ± 7.92 | 88.12 ± 3.46 | 90.02 ± 2.76 |
| Xanthan gum** | 44.84 ± 1.06 | 50.68 ± 2.47 | 53.26 ± 6.53 |
| CMC** | 63.17 ± 14.83 | 99.04 ± 9.56 | 107.74 19.47 |

Sample for emulsification: 10 g with 1:4, gum to MCT ratio.
*Sample prepared from fine corn fiber by alkaline peroxide technology (U.S. Pat. No. 5,766,662)
**Emulsification performance tested at 10 times lower concentration than other samples due to low solubility

TABLE 8

Demonstration of Novel Bio-Based Fiber Gums and Mixtures of this Invention to
stabilize oil-in-water emulsions. Emulsifier ability determined by measuring
emulsion particle diameter using laser diffraction particle-size analyzer.
Smaller particles indicate better emulsifiers. (μm)

| Samples— crude and semi pure BFG from corn bran | 0 Day | 3 Days | 7 Days |
|---|---|---|---|
| *Original pH 11.80* | | | |
| WS* evaporated to 19% Solids, ethanol precipitated, Sample A | 9.23 ± 3.22 | 15.99 ± 2.52 | 16.85 ± 2.77 |
| WS evaporated to 19% Solids, Spray Dried, Sample B | 4.84 ± 0.41 | 7.51 ± 0.97 | 9.86 ± 0.84 |
| WS evaporated to 23% Solids, Drum dried, Sample C | 4.84 ± 0.37 | 6.59 ± 0.47 | 7.91 ± 0.44 |
| *Adjusted to pH 7* | | | |
| WS evaporated to 20.07% Solids, Ethanol Precipitated, Sample D. | 39.22 ± 4.59 | 46.94 ± 2.83 | 55.92 ± 4.35 |
| WS evaporated to 20.07% Solids, Spray Dried, Sample E. | 40.78 ± 2.18 | 56.17 ± 5.61 | 63.38 ± 5.66 |
| WS evaporated to 22.74% Solids, Drum Dried, Sample F. | 17.20 ± 3.23 | 28.77 ± 0.84 | 32.30 ± 1.47 |
| *Adjusted to pH 4* | | | |
| WS evaporated to 39.29% Solids, Ethanol Precipitated, Sample G. | 15.37 ± 6.51 | 33.28 ± 10.27 | 36.13 ± 4.24 |
| WS evaporated to about 20% Solids, Spray Dried, Sample H. | 2.65 ± 0.12 | 29.41 ± 9.51 | 28.50 ± 2.98 |
| WS evaporated to 39.29% Solids, Drum Dried, Sample I. | 5.11 ± 1.07 | 42.58 ± 7.59 | 40.30 ± 4.58 |
| *Adjusted to pH 4 and Hemi. A Removed* | | | |
| WS evaporated to 34.02% Solids, Ethanol Precipitated, Sample. J. | 8.66 ± 2.59 | 32.35 ± 0.49 | 33.62 ± 5.60 |
| WS evaporated to about 20% Solids, Spray Dried, Sample K. | 3.63 ± 0.70 | 57.67 ± 3.41 | 58.43 ± 5.84 |
| WS evaporated to 34.02% Solids, Drum Dried, Sample L | 3.39 ± 1.01 | 48.81 ± 9.87 | 54.29 ± 0.72 |
| *UF Membrane Processed* | | | |
| Alkaline Extract from Corn Bran in Z-Trim Process (Waste Stream—WS) Original pH 11.8 and 0.6-1.69% solids purified by ultra-filtration as in FIG. 2: Retentate from 10K Dalton membrane, spray dried. Sample M | 26.03 ± 2.01 | 24.16 ± 1.82 | 26.25 ± 2.38 |
| Alkaline Extract from Corn Bran in Z-Trim Process (Waste Stream—WS) Original pH 11.8 and 0.6-1.69% solids purified by ultra-filtration as in FIG. 2: Permeate ± from 10K Dalton membrane. Sample N | 12.76 ± 0.98 | 59.30 ± 6.10 | 65.54 ± 3.09 |
| Alkaline Extract from Corn Bran in Z-Trim Process (Waste Stream—WS) Original pH 11.8 and 0.6-1.69% solids purified by ultra-filtration as in FIG. 2: Retentate from 50K Dalton membrane, spray dried. Sample O | 34.29 ± 4.61 | 35.97 ± 4.64 | 36.20 ± 5.35 |

TABLE 8-continued

Demonstration of Novel Bio-Based Fiber Gums and Mixtures of this Invention to stabilize oil-in-water emulsions. Emulsifier ability determined by measuring emulsion particle diameter using laser diffraction particle-size analyzer. Smaller particles indicate better emulsifiers. (μm)

| Samples— crude and semi pure BFG from corn bran | 0 Day | 3 Days | 7 Days |
|---|---|---|---|
| Alkaline Extract from Corn Bran in Z-Trim Process (Waste Stream—WS; Original pH 11.8 and 0.6-1.69% solids purified by ultra-filtration as in FIG. 2: Permeate from 50K Dalton membrane. Sample P | 8.53 ± 1.54 | 43.58 ± 2.25 | 48.08 ± 3.92 |
| Alkaline Extract from Corn Bran in Z-Trim Process (Waste Stream—WS) Original pH 11.8 and 0.6-1.69% solids purified by ultra-filtration as in FIG 2: Retentate from 100K Dalton membrane, spray dried. Sample Q | 40.97 ± 2.58 | 42.72 ± 5.30 | 43.12 ± 4.35 |
| Alkaline Extract from Corn Bran in Z-Trim Process (Waste Stream—WS) Original pH 11.8 and 0.6-1.69% solids purified by ultra-filtration as in FIG. 2: Permeate from 100K Dalton membrane. Sample R | 5.91 ± 0.08 | 45.41 ± 4.71 | 45.15 ± 11.26 |
| Purified Bio-Based Fiber Gum (Hemicellulose B) prepared from non-concentrated WS using ethanol precipitation, Hemicellulose A removal. Sample S. Also called ZTWS-11.55, Hemi. B (Prep 1). | 1.81 ± 0.08 | 2.07 ± 0.19 | 3.31 ± 0.03 |
| Purified Bio-Based Fiber Gun (Hemicelluloses A and B) prepared from non-concentrated corn Z Trim WS by diafiltration using 125 Dalton membrane. Sample U | 2.57 ± 0.16 | 3.13 ± 0.11 | 5.09 ± 0.60 |
| Purified Bio-Based Fiber Gum (Hemicelluloses A and B) prepared from non-concentrated oat Z Trim WS by diafiltration using 125 Dalton membrane. Sample V | 33.47 ± 4.39 | 59.79 ± 4.74 | 53.97 ± 3.91 |
| Oat Z Trim WS evaporated to 19% solids, then Spray Dried. Sample W | 2.64 ± 0.07 | 5.98 ± 0.24 | 7.02 ± 3.15 |
| Oat Z Trim WS evaporated to 26.% solids, then Drum Dried. Sample X | 3.90 ± 0.95 | 5.11 ± 1.05 | 7.91 ± 2.72 |

*WS = Waste Stream from U.S. Pat. No. 5,766,662 starting material.
Sample for emulsification: 30 g with 1:4, gum to MCT ratio.

TABLE 9

Demonstration of Novel and Pure Bio-Based Fiber Gums from biomasses to stabilize oil-in-water emulsions. Emulsifier ability determined by measuring emulsion particle diameter using laser diffraction particle-size analyzer. Smaller particles indicate better emulsifiers.(μm)

| Samples—Pure BFG (Hemi. B)from the following biomasses | 0 Day | 3 Days | 7 Days |
|---|---|---|---|
| Corn bran | 0.01 0.04 | 2.80 ± 0.49 | 9.03 ± 1.11 |
| Corn stover | 0.82 ± 0.08 | 1.19 ± 0.16 | 1.56 ± 0.25 |
| Rice fiber | 0.78 ± 0.10 | 1.00 ± 0.14 | 0.87 ± 0.10 |
| Wheat bran | 2.22 ± 0.32 | 14.88 ± 1.50 | 40.98 ± 11.96 |
| Wheat straw | 0.79 ± 0.01 | 1.43 ± 0.26 | 2.07 ± 0.67 |
| Switch grass | 0.81 ± 0.10 | 1.55 ± 0.21 | 1.44 ± 0.35 |
| Miscanthus | 0.78 ± 0.13 | 0.96 ± 0.09 | 0.96 ± 0.06 |
| Sugarcane bagasse | 0.88 ± 0.02 | 0.89 ± 0.07 | 2.69 ± 0.21 |
| Sorghum bran (Black milled) | 69.44 ± 8.07 | 125.76 ± 4.66 | 123.46 ± 6.37 |
| Sorghum bran (Sumac milled) | 15.97 ± 1.56 | 48.82 ± 9.53 | 73.68 ± 10.52 |
| Sorghum bran (Burgundy milled) | 3.19 ± 0.63 | 2.48 ± 0.08 | 2.97 ± 0.13 |

Sample for emulsification: 30 g with 1:4, gum to MCT ratio.

TABLE 10

Hydrophilic ORAC Values of Standard Compounds, Some Selected Novel BFG Compositions (Crude and Pure) and Original Biomasses

| Sample Tested | ORAC Value in μmol TE/100 gram |
|---|---|
| Purified Corn Fiber Own from U.S. Pat. No. 6,147, 206 | 5,200 |
| Purified Bio-Based Fiber Gum (Hemicellulose B) prepared from WS using ethanol precipitation, Hemicellulose A removal. Sample S. | 2,700 |
| WS*, pH 11.8, evaporated to 19% solids, then Spray Dried. Sample B | 169,800 |
| WS, pH 7, evaporated to 20.07% solids, then Spray Dried. Sample E | 159,700 |

TABLE 10-continued

Hydrophilic ORAC Values of Standard Compounds, Some Selected Novel BFG Compositions (Crude and Pure) and Original Biomasses

| Sample Tested | ORAC Value in μmol TE/100 gram |
|---|---|
| WS, pH 4, evaporated to 39.29% solids, then Spray Dried. Sample I | 133,600 |
| Purified Bio-Based Fiber Gum (Hemicelluloses A and B) prepared from non-concentrated corn Z Trim WS by diafiltration using 125 Dalton membrane. Sample U | 28,860 ± 4.55 |
| Purified Bio-Based Fiber Gum (Hemicelluloses A and B) prepared from non-concentrated oat Z Trim WS by diafiltration using 125 Dalton membrane. Sample V | 122,495 ± 79.12 |
| Corn bran | 1,935 ± 5.28 |
| Corn bran Hemi. B | 7,093 ± 0.30 |
| Corn stover | 2,803 ± 0.40 |
| Corn stover Hemi. B | 16,755 ± 4.91 |
| Rice fiber | 881 ± 0.74 |
| Rice fiber Hemi. B | 8,207 ± 3.93 |
| Wheat bran | 2,524 ± 0.99 |
| Wheat bran Hemi. B | 11,851 ± 3.26 |
| Wheat straw | 3,509 ± 1.03 |
| Wheat straw Hemi. B | 7,105 ± 0.04 |
| Switch grass | 2,714 ± 1.17 |
| Switch grass Hemi. B | 29,848 ± 4.86 |
| *Miscanthus* | 3,303 ± 1.06 |
| *Miscanthus* Hemi. B | 9,872 ± 1.24 |
| Sugarcane bagasse | 1,471 ± 0.49 |
| Sugarcane bagasse Hemi. B | 7,506 ± 0.90 |
| *Sorghum* bran (Black milled) | 77,750 ± 55.85 |
| *Sorghum* bran (Black milled) Hemi, B | 30,215 ± 42.02 |
| *Sorghum* bran (Sumac milled) | 64,7,61 ± 18.34 |
| *Sorghum* bran (Sumac milled) Hemi. B | 17,974 ± 8.67 |
| *Sorghum* bran (Burgundy milled) | 24,153 ± 5.54 |
| *Sorghum* bran (Burgundy milled) Hemi. B | 18,433 ± 5.84 |

ORAC value given in terms of Trolox equivalency (TE) per 100 gram.
*WS = Waste Stream from U.S. Pat. No. 5,766,662

TABLE 11

Molecular Characteristics of bio-based fiber (BFG) gums made from corn and oat brans Measured by HPSEC with Multi Angle Laser Light Scattering, Viscometric, and Refractive Index Detectors

| Sample | % Pure BFG[1] | Polydispersity Mw/Mn | Polydispersity Mz/Mn | Wt. Av. Mol. Wt. (Mw × 10−3) | Av. Intrinsic Viscosity (nw, dL/g) | Radius of (Gyration (Rgz, nm) | Radius of Hydrodynamics (Rhz, nm) | Mark-Houwink Exponent (a) |
|---|---|---|---|---|---|---|---|---|
| Alkaline Extract from Corn Bran in Z-Trim Process (Waste Stream—WS), Original pH 11.8 and 0.6-0.9% solids, and: | | | | | | | | |
| Sample A[2] WS evaporated to 19% solids, and then ethanol precipitated. | 61.1 ± 0.6 | 1.68 ± 0.02 | 4.20 ± 0.1 | 350 ± 3 | 1.53 ± 0.006 | 33.0 ± 0.1 | 28.8 ± 0.4 | 0.479 ± 0.01 |
| Sample B WS evaporated to 19% solids, then Spray Dried. | 43.0 ± 0.1 | 1.61 ± 0.007 | 3.42 ± 0.001 | 319 ± 3 | 1.50 ± 0.007 | 29.1 ± 0.01 | 26.3 ± 0.3 | 0.523 ± 0.004 |
| Sample C WS evaporated to 23% solids, then Drum Dried. | 41.5 ± 1 | 1.59 ± 0.01 | 3.67 ± 0.09 | 362 ± 2 | 1.54 ± 0.05 | 31.8 ± 0.7 | 28.6 ± 0.2 | 0.474 ± 0.04 |
| Alkaline Extract from Corn Bran in Z-Trim Process (Waste Stream—WS), Original pH 11.8 and 0.6-0.9% solids but pH adjusted to 7.0 with acid and: | | | | | | | | |
| Sample D WS (pH 7) evaporated to 20.07% solids, | 56.5 ± 0.3 | 1.51 ± 0.01 | 3.89 ± 0.4 | 189 ± 11 | 0.984 ± 0.004 | 25.3 ± 0.7 | 19.4 ± 0.7 | 0.577 ± 0.009 |

TABLE 11-continued

Molecular Characteristics of bio-based fiber (BFG) gums made from corn and oat brans Measured by HPSEC with Multi Angle Laser Light Scattering, Viscometric, and Refractive Index Detectors

| Sample | % Pure BFG[1] | Polydispersity Mw/Mn | Polydispersity Mz/Mn | Wt. Av. Mol. Wt. (Mw × 10−3) | Av. Intrinsic Viscosity (nw, dL/g) | Radius of (Gyration (Rgz, nm) | Radius of Hydrodynamics (Rhz, nm) | Mark-Houwink Exponent (a) |
|---|---|---|---|---|---|---|---|---|
| and then Ethanol Precipitated. Sample E | 47.5 ± 0.1 | 2.16 ± 0.05 | 34.3 ± 2 | 386 ± 13 | 0.886 ± 0.01 | 31.2 ± 0.2 | 42.2 ± 0.7 | 0.439 ± 0.002 |
| WS (pH 7) evaporated to 20.07% solids, and then Spray Dried. Sample F | 39.0 ± 0.1 | 1.83 ± 0.01 | 13.8 ± 0.8 | 235 ± 7 | 0.903 ± 0.003 | 28.4 ± 0.7 | 26.7 ± 1 | 0.550 ± 0.01 |
| WS (pH 7) evaporated to 22.74% solids and then Drum Dried. | | | | | | | | |
| Alkaline Extract from Corn Bran in Z-Trim Process (Waste Stream—WS), Original pH 11.8 and 0.6-0.9% solids but pH adjusted to 4.0 with acid and: | | | | | | | | |
| WS (pH 4) Evaporated and ethanol precipitated. Sample G. | 54.0 ± 0.3 | 1.71 ± 0.04 | 4.39 ± 0.2 | 74.9 ± 2.0 | 0.468 ± 0.008 | 23.5 ± 2.0 | 12.5 ± 0.3 | 0.502 ± 0.01 |
| WS (pH 4) Evaporated and Drum Dried, Sample H | 40.0 ± 0.2 | 1.68 ± 0.02 | 6.56 ± 0.2 | 80.3 ± 0.9 | 0.441 ± 0.003 | 27.3 ± 0.4 | 13.8 ± 0.2 | 0.798 ± 0.01 |
| WS (pH 4) Evaporated and Spray Dried. Sample I | 41.0 ± 0.4 | 1.65 ± 0.006 | 4.07 ± 0.09 | 79.8 ± 0.01 | 0.460 ± 0.006 | 28.9 ± 0.6 | 12.7 ± 0.2 | 0.800 ± 0.001 |
| Alkaline Extract from Corn Bran in Z-Trim Process (Waste Stream—WS), Original pH 11.8 and 0.6-0.9% solids but pH adjusted to 4.0 with acid and Hemi. A removed and then; | | | | | | | | |
| WS (pH 4) with Hemi A removed, Evaporated and ethanol precipitated. Sample J | 42.2 ± 0.1 | 1.49 ± 0.02 | 3.83 ± 0.4 | 39.0 ± 0.7 | 0.246 ± 0.03 | 45.4 ± 4.0 | 8.30 ± 0.5 | 0.927 ± 0.003 |
| WS (pH 4) with Hemi A removed Evaporated and Drum Dried. Sample K | 31.0 ± 1.0 | 1.51 ± 0.03 | 3.55 ± 0.5 | 37.1 ± 2.0 | 0.200 ± 0.01 | 30.7 ± 6.0 | 7.3 ± 0.6 | 0.940 ± 0.02 |
| WS (pH 4) with Hemi A removed Evaporated and Spray Dried. Sample L. | 30.0 ± 0.3 | 1.61 ± 0.03 | 3.56 ± 0.3 | 33.0 ± 0.3 | 0.199 ± 0.03 | 34.7 ± 0.3 | 6.9 ± 0.2 | 0.861 ± 0.03 |
| UF Membrane Processed Samples | | | | | | | | |
| Alkaline Extract from Corn Bran in Z-Trim Process (Waste Stream—WS) Original pH 11.8 and 0.6-1.69% solids purified by ultra-filtration as in FIG. 2: Retentate from 10K Dalton | 57.3 ± 0.7 | 2.07 ± 0.1 | 5.15 ± 0.5 | 236.0 ± 4.0 | 1.16 ± 0.02 | 28.3 ± 0.9 | 23.3 ± 0.3 | 0.544 ± 0.001 |

TABLE 11-continued

Molecular Characteristics of bio-based fiber (BFG) gums made from corn and oat brans Measured by HPSEC with Multi Angle Laser Light Scattering, Viscometric, and Refractive Index Detectors

| Sample | % Pure BFG[1] | Polydispersity Mw/Mn | Polydispersity Mz/Mn | Wt. Av. Mol. Wt. (Mw × 10−3) | Av. Intrinsic Viscosity (nw, dL/g) | Radius of (Gyration (Rgz, nm) | Radius of Hydrodynamics (Rhz, nm) | Mark-Houwink Exponent (a) |
|---|---|---|---|---|---|---|---|---|
| Sample M Alkaline Extract from Corn Bran in Z-Trim Process (Waste Stream—WS) Original pH 11.8 and 0.6-1.69% solids purified by ultra-filtration as in FIG. 2: Permeate from 10K Dalton Membrane. | | | | Molecular Weight too low for molecular characterization | | | | |
| Sample N Alkaline Extract from Corn Bran in Z-Trim Process (Waste Stream—WS) Original pH 11.8 and 0.6-1.69% solids purified by ultra-filtration as in FIG. 2: Retentate from 50K Dalton membrane, spray dried. | 50.0 ± 0.3 | 2.11 ± 0.05 | 5.37 ± 0.2 | 301.0 ± 0.01 | 1.30 ± 0.01 | 31.3 ± 0.2 | 26.6 ± 0.2 | 0.451 ± 0.009 |
| Sample O Alkaline Extract from Corn Bran in Z-Trim Process (Waste Stream— WS) Original pH 11.8 and 0.6-1.69% solids purified by ultra-filtration as in FIG. 2: Permeate from 50K Dalton membrane. | | | | Molecular weight too low for molecular characterization. | | | | |
| Sample P Alkaline Extract from Corn Bran in Z-Trim Process (Waste Stream—WS) Original pH 11.8 and 0.6-1.69% solids purified by ultra-filtration as in FIG. 2: Retentate from 100K Dalton membrane, spray dried. | 50.2 ± 0.2 | 2.05 ± 0.03 | 5.83 ± 0.2 | 263.0 ± 1.0 | 1.21 ± 0.01 | 29.7 ± 1.0 | 25.5 ± 0.1 | 0.507 ± 0.01 |
| Sample Q Alkaline Extract from Corn Bran in Z-Trim Process (Waste Stream—WS) Original pH 11.8 | | | | Molecular weight too low for molecular characterization. | | | | |

TABLE 11-continued

Molecular Characteristics of bio-based fiber (BFG) gums made from corn and oat brans Measured by HPSEC with Multi Angle Laser Light Scattering, Viscometric, and Refractive Index Detectors

| Sample | % Pure BFG[1] | Polydispersity Mw/Mn | Polydispersity Mz/Mn | Wt. Av. Mol. Wt. (Mw × 10−3) | Av. Intrinsic Viscosity (nw, dL/g) | Radius of (Gyration (Rgz, nm) | Radius of Hydrodynamics (Rhz, nm) | Mark-Houwink Exponent (a) |
|---|---|---|---|---|---|---|---|---|
| and 0.6-1.69% solids purified by ultra-filtration as in FIG. 2: Permeate from 100K Dalton membrane. Sample R | | | | | | | | |
| Sample S Purified Bio-Based Fiber Gum (hemicellulose B) prepared from non-concentrated WS using ethanol precipitation, Hemicellulose A removed. | 91.2 ± 1 | 1.64 ± 0.01 | 3.54 ± 0.04 | 335 ± 5 | 1.56 ± 0.02 | 32.9 ± 1 | 27.0 ± 0.2 | 0.453 ± 0.008 |
| Corn Bran Gum made from corn bran using prior art hydrogen peroxide process from Yadav, M. P., et al Cereal Chem., 84: 2 (2007) 175-180. Sample T | 87.5 ± 1.0 | 1.35 ± 0.01 | 2.52 ± 0.07 | 290 ± 4.0 | 1.35 ± 0.02 | 29.5 ± 0.03 | ND | 0.53 ± 0.02 |
| Purified Bio-Based Fiber Gum Hemicelluloses A and B) prepared from non-concentrated corn Z Trim WS by diafiltration using 125 Dalton membrane. Sample U | 64.3 ± 0.1 | 1.62 ± 0.03 | 3.50 ± 0.04 | 176 ± 2.0 | ND | 26.8 ± 1.0 | ND | ND |
| Purified Bio-Based Fiber Gum (Hemicelluloses A and B) prepared from non-concentrated oat Z Trim WS by diafiltration using 125 Dalton membrane. Sample V | 53.2 ± 0.6 | 2.79 ± 0.06 | 20.7 ± 0.1 | 68.0 ± 1.0 | 0.371 ± 0.004 | 13.2 ± 3.0 | 15.4 ± 0.1 | 0.607 ± 0.003 |
| Oat Z Trim WS evaporated to 19% solids then Spray Dried. Sample W | 14.5 ± 0.2 | 2.10 ± 0.2 | 16.1 ± 6.0 | 316 ± 34 | ND | 44.3 ± 7.0 | ND | ND |
| Oat Z Trim WS evaporated to 26.% solids, then Drum Dried. Sample X | 14.0 ± 0.3 | 3.17 ± 0.1 | 17.8 ± 2.0 | 182 ± 4.0 | 1.10 ± 0.04 | 40.8 ± 3.0 | 28.5 ± 1.0 | 0.281 ± 0.01 |

TABLE 11-continued

Molecular Characteristics of bio-based fiber (BFG) gums made from corn and oat brans Measured by HPSEC with Multi Angle Laser Light Scattering, Viscometric, and Refractive Index Detectors

| Sample | % Pure BFG[1] | Polydis-persity Mw/Mn | Polydis-persity Mz/Mn | Wt. Av. Mol. Wt. (Mw × 10-3) | Av. Intrinsic Viscosity (nw, dL/g) | Radius of (Gyration (Rgz, nm) | Radius of Hydro-dynamics (Rhz, nm) | Mark-Houwink Exponent (a) |
|---|---|---|---|---|---|---|---|---|
| Purified Corn fiber arabinoxylan extracted with NaOH and $H_2O_3$[3] | ND[4] | ND | ND | 394 | 1.92 | 33.7 | ND | 0.84 |

[1]The percentage of pure BFG (arabinoxylan) was estimated by the % recovery of sample from HPSEC column.
[2]Samples letters refer to sample-designations in Table 1. Refer to Table 1 for more information about samples.
[3]From Fishman, M. L., et al., Int. J. Polym. Anal. Charact., 5: 359-379 (2000).
[4]Not determined

TABLE 12

Molecular Characteristics of pure bio-based fiber gums (BFG) made from biomasses Measured by HPSEC with Multi Angle Laser Light Scattering and Refractive Index Detectors

| BFG Sample from | % Pure BFG[1] | Polydis-persity Mw/Mn | Polydis-persity Mz/Mn | Wt. Av. Mol. Wt. (Mw × 10-3) | Radius of Gyration (Rgz, nm) |
|---|---|---|---|---|---|
| Corn bran | 88.9 ± 0.3 | 3.45 ± 0.07 | 13.2 ± 0.3 | 362 ± 3.0 | 38.9 ± 0.3 |
| Corn stover | 92.9 ± 0.3 | 3.71 ± 0.03 | 15.5 ± 0.1 | 367 ± 3.0 | 39.6 ± 0.1 |
| Rice fiber | 100 ± 1.0 | 2.36 ± 0.007 | 31.8 ± 0.9 | 32.6 ± 0.4 | 20.3 ± 1.0 |
| Wheat bran | 68.6 ± 1.0 | 3.04 ± 0.2 | 7.38 ± 0.4 | 437 ± 6.0 | 45.2 ± 2.0 |
| Wheat straw | 80.7 ± 0.06 | 3.31 ± 0.06 | 16.1 ± 0.4 | 148 ± 2.0 | 30.6 ± 0.3 |
| Switch brass | 83.8 ± 0.1 | 4.48 ± 0.1 | 69.4 ± 4.0 | 130 ± 5.0 | 31.7 ± 1.0 |
| *Miscanthus* | 88.8 ± 1.0 | 3.19 ± 0.06 | 35.6 ± 4.0 | 69.1 ± 0.4 | 32.8 ± 1.0 |
| Sugarcane bagasse | 94.6 ± 0.06 | 5.61 ± 0.05 | 63.8 ± 2.0 | 221 ± 1.0 | 35.4 ± 0.2 |
| *Sorghum* bran (Black milled) | 61.4 ± 0.3 | 1.89 ± 0.03 | 4.07 ± 0.03 | 324 ± 7.0 | 37.4 ± 0.4 |
| *Sorghum* bran (Sumac milled) | 74.0 ± 0.7 | 1.94 ± 0.04 | 4.25 ± 0.1 | 363 ± 10.0 | 37.3 ± 0.8 |
| *Sorghum* bran (Burgundy milled) | 85.4 ± 0.2 | 2.19 ± 0.05 | 5.40 ± 0.2 | 373 ± 3.0 | 40.8 ± 0.3 |

[1]The percentage of pore BFG (arabihoxylan) was estimated by the % recovery of sample from HPSEC column.

TABLE 13

Carbohydrate Composition of BioFiber Gums Made from Corn and Oat Brans

Carbohydrate Composition (Relative Mole %)

| Sample | Arabinose | Galactose | Glucose | Xylose | Galacturonic Acid | Glucaronic Acid | Total |
|---|---|---|---|---|---|---|---|
| Sample A[1] Semi Pure BFG (pH 11.8) EtOH Ppted. | 24.12 | 8.25 | 13.66 | 48.72 | 0.42 | 4.84 | 100.00 |
| Sample B Crude BFG (pH 11.8) Spray Dried | 26.68 | 7.19 | 13.69 | 48.68 | 0.45 | 3.30 | 100.00 |
| Sample C Crude BFG (pH 11.8) Drum Dried | 26.14 | 7.00 | 13.52 | 50.30 | 0.00 | 3.03 | 100.00 |
| Sample D, Semi Pure BFG (pH 7), EtOH Ppted. | 29.78 | 8.94 | 2.16 | 53.61 | 1.21 | 4.30 | 100.00 |

TABLE 13-continued

Carbohydrate Composition of BioFiber Gums Made from Corn and Oat Brans

| Sample | Carbohydrate Composition (Relative Mole %) | | | | | | |
|---|---|---|---|---|---|---|---|
| | Arabinose | Galactose | Glucose | Xylose | Galacturonic Acid | Glucaronic Acid | Total |
| Sample E, Crude BFG (pH 7) Spray Dried | 29.27 | 8.97 | 2.67 | 53.75 | 0.90 | 4.43 | 100.00 |
| Sample F, Crude BFG (pH 7) Drum Dried | 29.57 | 8.97 | 1.77 | 54.34 | 0.77 | 4.58 | 100.00 |
| Sample G, Semi Pure BFG (pH 4, w/Hemi. A), EtOH Ppted. | 24.80 | 13.90 | 1.35 | 51.75 | 0.10 | 8.10 | 100.00 |
| Sample H, Crude BFG (pH 4, W/Hemi. A) Spray Dried | 25.46 | 12.24 | 2.57 | 53.84 | 0.18 | 5.72 | 100.00 |
| Sample I, Crude BFG (pH 4, W/Hemi. A) Drum Dried | 26.07 | 12.77 | 1.04 | 54.50 | 0.00 | 5.63 | 100.00 |
| Sample J, Semi Pure BFG (pH 4, W/O HA) EtOH Ppted. | 23.74 | 13.31 | 1.55 | 54.80 | 0.08 | 6.53 | 100.00 |
| Sample K, Crude BFG (pH 4, W/O HA) Spray Dried | 24.38 | 11.91 | 1.85 | 55.79 | 0.01 | 6.05 | 100.00 |
| Sample L, Crude BFG (pH 4, W/O HA) Drum Dried | 24.47 | 12.05 | 2.14 | 55.16 | 0.10 | 6.08 | 100.00 |
| Sample M, Retentate from 10K Dalton membrane | 26.25 | 13.35 | 4.06 | 51.38 | 0.00 | 4.96 | 100.00 |
| Sample N, Permeate from 10K Dalton membrane | 11.27 | 7.62 | 65.72 | 13.49 | 0.00 | 1.90 | 100.00 |
| Sample O, Retentate from 50K Dalton membrane | 25.46 | 14.52 | 5.90 | 50.90 | 0.00 | 3.22 | 100.00 |
| Sample P, Permeate from 50K Dalton membrane | 8.40 | 5.77 | 70.14 | 13.29 | 0.00 | 2.40 | 100.00 |
| Sample Q Retentate from 100K Dalton membrane | 24.38 | 13.90 | 9.74 | 48.96 | 0.00 | 3.03 | 100.00 |
| Sample R, Permeate from 100K Dalton membrane | 4.91 | 3.75 | 83.13 | 7.27 | 0.00 | 0.94 | 100.00 |
| Sample S Pure BFG | 25.79 | 8.72 | 6.36 | 50.90 | 0.95 | 7.28 | 100.00 |
| Sample T, Corn Bran Gum made | 30.70 | 7.93 | 1.42 | 55.83 | 0.00 | 4.10 | 100.00 |

TABLE 13-continued

Carbohydrate Composition of BioFiber Gums Made from Corn and Oat Brans

Carbohydrate Composition (Relative Mole %)

| Sample | Arabinose | Galactose | Glucose | Xylose | Galacturonic Acid | Glucaronic Acid | Total |
|---|---|---|---|---|---|---|---|
| from corn bran using prior art hydrogen peroxide process from Yadav, M. P., et al Food Hydrocolloids, 21: 7 (2007) 1022-1030 | | | | | | | |
| Purified Bio-Based Fiber Gum (Hemicelluloses A and B) prepared from non-concentrated corn Z Trim WS by diafiltration using 125 Dalton membrane. Sample U | 27.05 | 12.18 | 0.39 | 55.88 | 0.00 | 4.49 | 100.00 |
| Purified Bio-Based Fiber Gum (Hemicelluloses A and B) prepared from non-concentrated oat Z Trim WS by diafiltration using 125 Dalton membrane. Sample V | 21.80 | 12.36 | 1.73 | 59.33 | 0.47 | 4.31 | 100.00 |
| Oat Z Trim WS evaporated to 19% solids, then Spray Dried. Sample W | 12.85 | 3.56 | 22.98 | 59.62 | 0.00 | 0.98 | 100 |
| Oat Z Trim WS evaporated to 26% solids, then Drum Dried. Sample X | 9.55 | 3.60 | 31.05 | 54.17 | 0.00 | 1.64 | 100.00 |
| Pure Corn Fiber Gum from Doner et al. 1998[2] | 39.4 | 8.4 | 0.8 | 48.1 | — | 4.2 | 100.00 |

[1] Samples letters refer to sample-designations in Table 1. Refer to Table 1 for more information about samples.
[2] Doner, L. W., et al., Cereal Chem., 75(4): 408-411 (1998)

TABLE 14

Encapsulation of oils using BFG

| Material | Theoretical Loading % | Appearance | Air Speed (m$^3$/min) | Air in Temp(° C.) | Recovered % | % Loading (by TGA*) |
|---|---|---|---|---|---|---|
| 1. Purified Bio-Based Fiber Gum (Hemicelluloses A and B) prepared from non-concentrated corn Z Trim WS by diafiltration using 125 Dalton membrane. | 16.7 | Tan powder | 0.3 | 120 | 64 | 9.733 |
|  | 40 | Tan Powder |  | 120 | 62 | 6.618 |

TABLE 14-continued

Encapsulation of oils using BFG

| Material | Theoretical Loading % | Appearance | Air Speed (m³/min) | Air in Temp(° C.) | Recovered % | % Loading (by TGA*) |
|---|---|---|---|---|---|---|
| Sample U in Table 1. | | | | | | |
| 2. Gum *Acacia* | 16.7 | Off-white Powder | | 130 | 59 | 8.122 |
| | 40 | Off-white Powder | | 139 | 48 | 9.714 |
| 3. BFG (Hemi. B) Isolated from Sample #1 above. | 25 | Tan Powder | | 150 | 75 | 6.593 |
| | 40 | Tan Powder | | 150 | 73 | 6.051 |

*Thermal gravimetric analysis

TABLE 15

Properties of purified Corn-bran BFG and a commercial plywood PF resin

| | PF Resin BDW2021 | Purified corn bran BFG |
|---|---|---|
| Solids % | 44.0 | 11.5 |
| Viscosity (cp) | 630 | 4800 |
| pH | 12.0 | 12.4 |
| Gel Time at 100° C. (min) | 12 | No gelation (within 2 hrs) |

TABLE 16

Ingredients and Properties of Glue Mixes with and Without BFG

| | CONTROL | GLUE MIX #1 | GLUE MIX #2 | GLUE MIX #3 | GLUE MIX #4a |
|---|---|---|---|---|---|
| PF RESIN | 1100 | 880 | 880 | 880 | 990 |
| WATER | 300 | | | | 200 |
| BFG | | 842 | 842 | 842 | 421 |
| WHEAT FLOUR | 100 | 100 | 100 | | 100 |
| COBFIL | 350 | 350 | 350 | 350 | 350 |
| SODA ASH | 70 | 70 | 70 | 70 | 70 |
| PF RESIN | 1150 | 920 | 920 | 920 | 1035 |
| WATER | 350 | | 1000 | | 300 |
| BFG | | 880 | 880 | 880 | 440 |
| TOTAL WEIGHT | 3420 | 4042 | 5042 | 3942 | 3906 |
| BFG % SUBSTITUTION | 0 | 20 | 20 | 20 | 10 |
| SOLIDS % | 44 | 37 | 30 | 38 | 39 |
| pH | 12.0 | | 12.3 | 12.5 | 12.5 |
| GEL TIME (min) | 4 | | 35 | 22 | 6 |
| VISCOSITY | 4,920 cp | 7,420 cp | >20,000 cp | 7,090 cp | |
| USABILITY | YES | NO (too tick) | NO (Dry-out) | NO (Dry-out) | YES |

TABLE 17

Summary of Vacuum-Pressure Tests and Boil-Dry Tests

| | C1 | C2 | C3 | E1 | E2 | E3 | E4 | E5 | E6 |
|---|---|---|---|---|---|---|---|---|---|
| | Vacuum Pressure Tests | | | | | | | | |
| Shear Load (psi) | 117 | 137 | 134 | 138 | 122 | 117 | 120 | 114 | 129 |
| Wood Failure % | 98 | 95 | 93 | 74 | 90 | 94 | 86 | 86 | 54 |
| | Boil-Dry-Boil Tests | | | | | | | | |
| Shear Load (psi) | 120 | 124 | 126 | 125 | 114 | 116 | 116 | 106 | 117 |
| Wood Failure % | 96 | 96 | 90 | 54 | 89 | 96 | 88 | 93 | 82 |

TABLE 18

Using BFG as a binder for briquette preparation

| Green | | Dry | |
|---|---|---|---|
| Peak (g) | Area (N) | Peak (g) | Area (N) |
| Starch binder with Wood Char added after pre-gelatinized starch 6% starch | | | |
| 3,311.5 | 157.0 | 9,785.9 | 585.1 |
| 2,837.1 | 133.7 | 12,446.7 | 738.8 |
| 2,787.8 | 125.7 | 14,799.6 | 666.6 |

TABLE 18-continued

Using BFG as a binder for briquette preparation

| | Green | | Dry | |
|---|---|---|---|---|
| | Peak (g) | Area (N) | Peak (g) | Area (N) |
| | 2,888.9 | 139.7 | 15,831.6 | 965.4 |
| | 1,866.6 | 99.9 | 16,014.5 | 658.9 |
| Average | 2,734.4 | 131.2 | 13,775.7 | 723.0 |
| BFG #1 with Wood Char added after premixing with water 2% BFG | | | | |
| | 459.7 | 11.6 | 3,460.5 | 116.4 |
| | 467.1 | 18.1 | 2,547.8 | 125.5 |
| | 585.0 | 19.1 | 3,493.2 | 107.7 |
| | 511.1 | 17.3 | 3,371.3 | 92.5 |
| | 544.4 | 13.8 | 2,971.6 | 101.2 |
| Average | 513.5 | 16.0 | 3,168.9 | 108.7 |
| BFG #1 with Wood Char added dry and activated with water 2% BFG | | | | |
| | 635.6 | 20.8 | 3,226.0 | 115.0 |
| | 393.7 | 15.3 | 2,849.2 | 102.1 |
| | 432.5 | 12.8 | 2,834.1 | 99.0 |
| | 337.6 | 14.1 | 3,226.8 | 125.1 |
| | 482.9 | 14.9 | 3,477.0 | 117.7 |
| Average | 456.5 | 15.6 | 3,122.6 | 111.8 |
| BFG #2 with Wood Char added dry and activated with water 2.5% BFG | | | | |
| | 856.2 | 31.2 | 4,599.5 | 233.5 |
| | 754.4 | 29.3 | 5,846.2 | 314.0 |
| | 777.1 | 24.5 | 4,882.5 | 211.1 |
| | 844.7 | 29.5 | 5,098.3 | 216.5 |
| | 772.5 | 28.1 | 6,210.1 | 260.9 |
| Average | 801.0 | 28.5 | 5,327.3 | 247.2 |

TABLE 19

Carbohydrate Composition of Hemicellulose A Isolated from Biomasses (Relative Mole %)

| Sample | Fuc | Rha | Ara | Gal | Glc | Xyl | GalA | GlcA | Total |
|---|---|---|---|---|---|---|---|---|---|
| 1. Corn bran | 0.00 | 0.00 | 35.26 | 5.29 | 3.25 | 48.62 | 0.0 | 7.48 | 100.00 |
| 2. Corn stover | 0.55 | 1.64 | 16.46 | 7.63 | 16.62 | 51.87 | 1.84 | 3.38 | 100.00 |
| 3. Rice fiber | 0.00 | 0.28 | 14.62 | 2.40 | 4.14 | 77.72 | 0.03 | 0.81 | 100.00 |
| 4. Wheat bran | 0.00 | 0.07 | 27.32 | 4.05 | 36.67 | 27.86 | 0.00 | 4.03 | 100.00 |
| 5. Wheat straw | 0.00 | 0.58 | 14.66 | 2.76 | 5.58 | 74.57 | 0.74 | 1.10 | 100.00 |
| 6. Switch grass | 0.00 | 1.31 | 15.35 | 2.69 | 6.18 | 73.35 | 0.00 | 1.11 | 100.00 |
| 7. *Miscanthus* | 0.00 | 0.35 | 14.56 | 1.67 | 7.18 | 75.24 | 0.21 | 0.79 | 100.00 |
| 8. Sugarcane bagasse | 0.00 | 0.41 | 13.97 | 2.48 | 7.23 | 75.01 | 0.00 | 0.91 | 100.00 |
| 9. *Sorghum* bran (Black milled) | 0.00 | 0.55 | 26.82 | 3.06 | 43.97 | 23.21 | 0.79 | 1.59 | 100.00 |
| 10. *Sorghum* bran (Sumac milled) | 0.00 | 0.81 | 27.05 | 3.11 | 41.24 | 24.64 | 1.66 | 1.49 | 100.00 |
| 11. *Sorghum* bran (Burgundy milled) | 0.00 | 0.74 | 36.63 | 2.82 | 15.20 | 41.25 | 1.03 | 2.33 | 100.00 |

TABLE 20

Carbohydrate Composition of Pure Bio-based Fiber Gums (Hemicellulose B) Isolated From Biomasses (Relative Mole %)

| Sample | Fuc | Rha | Ara | Gal | Glc | Xyl | GalA | GlcA | Total |
|---|---|---|---|---|---|---|---|---|---|
| 1. Corn bran | 0.19 | 0.43 | 27.41 | 12.06 | 4.27 | 48.43 | 1.02 | 6.20 | 100.00 |
| 2. Corn stover | 0.84 | 1.32 | 17.99 | 10.85 | 9.58 | 52.25 | 1.75 | 5.42 | 100.00 |
| 3. Rice fiber | 0.20 | 0.97 | 18.12 | 8.06 | 3.64 | 65.36 | 1.57 | 2.07 | 100.00 |
| 4. Wheat bran | 0.00 | 0.55 | 31.10 | 5.27 | 14.00 | 46.03 | 0.83 | 2.21 | 100.00 |
| 5. Wheat straw | 0.28 | 2.50 | 19.67 | 11.67 | 7.25 | 54.46 | 1.69 | 2.50 | 100.00 |
| 6. Switch grass | 0.33 | 1.12 | 19.04 | 7.25 | 6.33 | 61.69 | 1.67 | 2.57 | 100.00 |
| 7. *Miscanthus* | 0.31 | 1.00 | 18.46 | 7.99 | 10.17 | 57.89 | 1.90 | 2.28 | 100.00 |
| 8. Sugarcane bagasse | 0.19 | 1.28 | 17.12 | 6.37 | 12.38 | 58.39 | 2.16 | 2.11 | 100.00 |
| 9. *Sorghum* bran (Black milled) | 0.16 | 0.98 | 34.33 | 3.24 | 4.28 | 49.75 | 3.06 | 4.19 | 100.00 |
| 10. *Sorghum* bran (Sumac milled) | 0.13 | 0.98 | 34.55 | 3.07 | 8.12 | 48.78 | 1.00 | 3.37 | 100.00 |
| 11. *Sorghum* bran (Burgundy milled) | 0.15 | 1.42 | 32.44 | 4.66 | 7.77 | 47.86 | 1.45 | 4.26 | 100.00 |

We claim:

1. A process for the preparation of bio-based fiber gums comprising:
   (a) mixing agricultural materials with a heated alkaline solution at temperatures in the range of about 75° to about 150° C. to form a slurry;
   (b) separating out the insoluble components from said slurry to yield a solution having a pH of about 9 to about 14 wherein said solution contains about 0.1 to about 10 wt % solids wherein said solids are alkaline soluble fractions;
   and one of the following:
   (c) evaporating said solution to about 16 to about 23 wt % solids and drying to a powder;
   (d) adjusting the pH of said solution to a pH of about 2 to about 12, evaporating said solution to about 16 to about 23 wt % solids and drying to a powder;
   (e) evaporating said solution to about 16 to about 23 wt % solids, adjusting the pH of said solution to a pH of about 2 to about 12 and drying to a powder;
   (f) evaporating said solution to about 16 to about 23 wt % solids and precipitating out said soluble components with about two to about five volumes of solvent to form a precipitate and a supernatant, and separately drying said precipitate and said supernatant;
   (g) evaporating said solution to about 16 to about 23 wt % solids, adjusting the pH of said solution to a pH of about 2 to about 12 and precipitating out said soluble components with one to five volumes of organic solvent to form a precipitate and a supernatant, and separately drying said precipitate and said supernatant;
   (h) adjusting the pH of said solution to a pH of about 2 to about 12, evaporating said solution to about 16 to about 23 wt % solids and precipitating out said soluble components with about one to five volumes of organic solvent to form a precipitate and a supernatant, and separately drying said precipitate and said supernatant; or
   (i) adjusting the pH of said solution to a pH of about 2 to about 5 to precipitate Hemicellulose A and the remaining solution is treated with about 2 volumes of solvent to form a precipitate and a supernatant, and separately drying said precipitate and said supernatant; and
   optionally the solution is pretreated with at least one of the following:
   (1) de-salting said solution and the de-salted solution becomes the solution;
   (2) processing said solution through at least one nano-filtration membrane or ultra-filtration membrane or diafiltration membrane and the permeate becomes the solution; or
   (3) processing said solution through at least one nano-filtration membrane or ultra-filtration membrane or diafiltration membrane and the retentate becomes the solution wherein said process does not utilize oxidizing agents and wherein said product contains feruloyl-arabinoxylans.

2. The process according to claim 1, wherein said drying is by drum drying or spray drying.

3. The process according to claim 1, wherein said process does not utilize oxidizing agents.

4. The process according to claim 3, wherein said oxidizing agents are selected from the group consisting of hydrogen peroxide, sodium hypochlorite, and mixtures thereof.

5. The process according to claim 1, wherein said agricultural materials is selected from the group consisting of corn bran, corn fiber, oat bran, oat fiber, wheat bran, wheat fiber, barley straw, barley hull, switchgrass, sugar cane bagasse, miscanthus, corn stover, wheat straw, sorghum bran, and mixtures thereof.

6. The process according to claim 1, said process comprising:
   (a) mixing agricultural materials with a heated alkaline solution at temperatures in the range of about 75° C. to about 150° C. to form a slurry;
   (b) separating out the insoluble components from said slurry to yield a solution having a pH of about 9 to about 14 wherein said solution contains about 0.1 to about 10 wt % solids wherein said solids are alkaline soluble fractions;
   and at least one of the following:
   (c) evaporating said solution to about 16 to about 23 wt % solids and drying to a powder;
   (d) adjusting the pH of said solution to a pH of about 2 to about 12, evaporating said solution to about 16 to about 23 wt % solids and drying to a powder,
   (e) evaporating said solution to about 16 to about 23 wt % solids, adjusting the pH of said solution to a pH of about 2 to about 12 and drying to a powder;
   (f) evaporating said solution to about 16 to about 23 wt % solids and precipitating out said soluble components with about two to about five volumes of organic solvent to form a precipitate and a supernatant, and separately drying said precipitate and said supernatant;
   (g) adjusting the pH of said solution to a pH of about 2 to about 12, evaporating said solution to about 16 to about 23 wt % solids and precipitating out said soluble components with two to about five volumes of organic solvent to form a precipitate and a supernatant, and separately drying said precipitate and said supernatant;
   (h) evaporating said solution to about 16 to about 23 wt % solids, adjusting the pH of said solution to a pH of about 2 to about 12, precipitating out said soluble components with organic solvent to form a precipitate and a supernatant, and separately drying said precipitate and said supernatant;
   (i) adjusting the pH of said solution to a pH of about 2 to about 5 to precipitate Hemicellulose A and treating the remaining solution with 2 volumes of organic solvent to form a precipitate and a supernatant, and separately drying said precipitate and said supernatant; and
   optionally the solution is pretreated with at least one of the following:
   (1) processing said solution through a 10,000 Dalton MWCO ultrafiltration membrane to form a permeate which becomes a solution containing alkaline soluble fractions with molecular weight<10,000 Daltons;
   (2) processing said solution through a 10,000 Dalton MWCO ultrafiltration membrane to form a retentate and a permeate, and processing said retentate through a 50,000 Dalton membrane to form a permeate which becomes a solution containing alkaline soluble fractions with molecular weights between 10,000 and 50,000 Daltons;
   (3) processing said solution through a 10,000 Dalton MWCO ultrafiltration membrane to form a first retentate, and processing said first retentate through a 50,000 Dalton MWCO membrane to form a second retentate, and processing said second retentate through a 100,000 Dalton MWCO membrane and the permeate becomes a solution containing alkaline soluble fractions with molecular weights between 50,000 and 100,000 Daltons;

(4) processing said solution through a 10,000 Dalton MWCO ultrafiltration membrane to form a first retentate, and processing said first retentate through a 50,000 Dalton MWCO membrane to form a second retentate, and processing said second retentate through a 100,000 Dalton MWCO membrane to form a third retentate which becomes a solution containing alkaline soluble fractions with molecular weight greater than 100,000 Daltons;

(5) processing said solution through a 10,000 Dalton MWCO ultrafiltration membrane to from a first retentate, and processing said first retentate through a 50,000 Dalton MWCO membrane to form a second retentate, and processing said second retentate through a 100,000 Dalton MWCO membrane to form a third retentate and adjusting the pH of said third retentate to a pH of about 2 to about 5 to precipitate out a precipitant which is then dried to yield hemicellulose-A and the remaining solution contains a BFG product with a molecular weight greater than 100,000 Dalton and is soluble at all pH values;

(6) processing said solution through a 10,000 Dalton MWCO ultrafiltration membrane to form (a) a permeate that is evaporated and dried to yield a product with molecular weight<10,000 Daltons and (b) a retentate which is evaporated and dried to yield a product with molecular weight>10,000 Daltons;

(7) processing the solution through a 50,000 Dalton MWCO ultrafiltration membrane to form (a) a permeate that is evaporated and dried to yield a product with molecular weight<50,000 Daltons and (b) a retentate which is evaporated and dried to yield a product with molecular weight>50,000 Daltons;

(8) processing the solution through a 100,000 Dalton MWCO ultrafiltration membrane to form (a) a permeate that is evaporated and dried to yield a product with molecular weight<100,000 Daltons and (b) a retentate which is evaporated and dried to yield a product with molecular weight>100,000 Daltons;

(9) processing the solution through a 100,000 Dalton MWCO ultrafiltration membrane to form a retentate containing a product with molecular weight>100,000 Daltons and adjusting the pH of said retentate to a pH of about 2 to about 5 to form (a) a precipitate which is then dried to form hemicellulose-A and (b) a solution containing a product with a molecular weight greater than 100,000 Daltons that is soluble at all pH values;

(10) removing salts and ash from said solution;

(11) removing salts and ash from said solution and evaporating said solution to about 16 to about 23 wt % solids and then drying;

(12) removing salts and ash from said solution and adjusting the pH of the solution to a pH of about 2 to about 5 to form (a) a precipitant which is then dried to form hemicellulose-A and (b) a solution containing hemicellulose B; or

(13) pretreating said solution by ultrafiltration or diafiltration or nanofiltration with or without pH adjustment before or after said ultrafiltration or said diafiltration or said nanofiltration to form (a) a retentate or retentates which becomes the solution and (b) the resulting permeate or permeates becomes the solution.

7. A product produced by a process of comprising (a) mixing agricultural materials with a heated alkaline solution at temperatures in the range of about 75° to about 150° C. to form a slurry;

(b) separating out the insoluble components from said slurry to yield a solution having a pH of about 9 to about 14 wherein said solution contains about 0.1 to about 10 wt % solids wherein said solids are alkaline soluble fractions;

and one of the following:

(c) evaporating said solution to abort 16 to about 23 wt % solids and drying to a powder;

(d.) adjusting the pH of said solution to a pH of about 2 to about 12, evaporating said solution to about 16 to about 23 wt % solids and drying to a powder;

(e) evaporating said solution to about 16 to about 23 wt % solids, adjusting of said solution to a pH of about 2 to about 12 and drying to a powder;

(f) evaporating said solution to about 16 to about 23 wt % solids and precipitating out said soluble components with about two to about five volumes of organic solvent to form a precipitate and a supernatant, and separately drying said precipitate and said supernatant;

(g) evaporating said solution to about 16 to about 23 wt % solids, adjusting the pH of said solution to a pH of about 2 to about 12 and precipitating out said soluble components with one to five volumes of organic solvent to form a precipitate and a supernatant, and separately drying said precipitate and said supernatant;

(h) adjusting the pH of said solution to a pH of about 2 to about 12, evaporating said solution to about 16 to about 23 wt % solids and precipitating out said soluble components with about one to five volumes of organic solvent to form a precipitate and a supernatant, and separately drying said precipitate and said supernatant; or (i) adjusting the pH of said solution to a pH of about 2 to about 5 to precipitate Hemicellulose A and the remaining solution is treated with about 2 volumes of organic solvent to form a precipitate and a. supernatant, and separately drying said precipitate and said supernatant; and optionally the solution is pretreated with at least one of the following:

(1) de-salting said solution and the de-salted solution becomes the solution;

(2) processing said solution through at least one nanofiltration membrane or ultra-filtration membrane or diafiltration membrane and the permeate becomes the solution; or (3) processing said solution through at least one nanofiltration membrane or ultra-filtration membrane or diafiltration membrane and the retentate becomes the solution;

wherein said process does not utilize oxidizing agents and wherein said product contains feruloyl-arabinoxylans.

8. The product according to claim 7, wherein said. product contains about 24 to about 27% arabinose.

9. The product according to claim 7, wherein said product contains about 6 to about 14% glucose.

10. The product according to claim 7, wherein said product has a ratio of arabinose/xylose of about 0.5.

11. A composition comprising (a) a product produced by the process of claim 1 as a binder and (b) carbonaceous materials.

12. An oil-in-water or water-in-oil composition comprising (a) a product as an emulsifier, (b) oil and (c) water; wherein said product is prepared by a process comprising (a) mixing agricultural materials with a heated alkaline solution at temperatures in the range of about 75° to about 150°C to form a slurry;

(b) separating out the insoluble components from said slurry to yield a solution having a pH of about 9 to about 14 wherein said solution contains about 0.1 to about 10 wt % solids wherein said solids are alkaline soluble fractions;

and one of the following:

(c) evaporating said solution to about 16 to about 23 wt % solids and drying to a powder;

(d) adjusting the pH of said solution to a pH of about 2 to about 12, evaporating said solution to about 16 to about 23 wt % solids and drying to a powder;

(e) evaporating said solution to about 16 to about 23 wt % solids, adjusting the pH of said so ion to a pH of about 2 to about 12 and drying to a powder;

(f) evaporating said solution to about 16 to about 23 wt % solids and precipitating out said soluble components with about two to about five volumes of organic solvent to fonn a precipitate and a supernatant, and separately drying said precipitate and said supernatant;

(g) evaporating said solution to about 16 to about 23 wt h% solids, adjusting the pH of said solution to a pH of about 2 to about 12 and precipitating out said soluble components with one to five volumes of organic solvent to form a precipitate and a supernatant, and separately drying said precipitate and said supernatant;

(h) adjusting the pH of said solution to a pH of about 2 to about 12, evaporating said solution to about 16 to about 23 wt % solids and precipitating out said soluble components with about one to five volumes of organic solvent to form a precipitate and a supernatant, and separately drying said precipitate and said supernatant; or (i) adjusting the pH of said solution to a pH of about 2 to about 5 to precipitate Hemicellulose A and the remaining solution is treated with about 2 volumes of organic solvent to form a precipitate and a supernatant, and separately drying said precipitate and said supernatant; and optionally the solution is pretreated with at least one of the following:

(1) de-salting said solution and the de-salted solution becomes the solution;

(2) processing said solution through at least one nano-filtration membrane or ultra-filtration membrane or diafiltration membrane and the permeate becomes the solution; or (3) processing said solution through at least one nano-filtration membrane or ultra-filtration membrane or diafiltration membrane and the retentate becomes the solution;

wherein said process does not utilize oxidizing agents and wherein said product contains feruloyl-arabinoxylans.

13. The oil-in-water or water-in-oil composition according to claim 12, wherein said product contains about 24 to about 27% arabinose.

14. The oil-in-water or water-in-oil composition according to claim 12, wherein said product contains about 6 to about 14% glucose.

15. The oil-in-water or water-in-oil composition according to claim 12, wherein said product has a. ratio of arabinose/xylose of about 0.5.

16. A composition comprising (a) a product produced by the process of claim 1 as an antioxidant and (b) a material that is oxidizable.

17. A method of reducing oxidation of a composition that is oxidizable, said method comprising adding the product produced by the process of claim 1 to a composition that is oxidizable.

18. A method of binding carbonaceous materials, said method comprising adding the product produced by the process of claim 1 to carbonaceous materials, and pelletizing.

19. A method for stabilizing an oil-in-water or water-in-oil emulsion, said method comprising adding the product produced by the process of claim 1 to oil and water.

20. A method for producing plywood with less phenol-formaldehyde resin, said method comprising adding the product produced by the process of claim 1 to plywood formulations, pressing and heating.

21. A method of stabilizing oxidizable material, said method comprising adding the product produced by the process of claim 1 to the oxidizable material to form an emulsion and spray drying to form an encapsulated product.

* * * * *